United States Patent
Guo et al.

(10) Patent No.: US 12,451,858 B2
(45) Date of Patent: Oct. 21, 2025

(54) REDUCING IMPEDANCE MATCHING COMPONENTS IN FRONT END ARCHITECTURES FOR MULTI-BAND TRANSMIT AND RECEIVE FUNCTIONS

(71) Applicant: SKYWORKS SOLUTIONS, INC., Irvine, CA (US)

(72) Inventors: Jiunn-Sheng Guo, Eastvale, CA (US); Tianming Chen, Newbury Park, CA (US); Joji Fujiwara, Suita (JP); Russ Alan Reisner, Oxnard, CA (US); Nobuyuki Tsujimoto, Osaka (JP)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 218 days.

(21) Appl. No.: 17/990,595

(22) Filed: Nov. 18, 2022

(65) Prior Publication Data

US 2023/0163745 A1    May 25, 2023

Related U.S. Application Data

(60) Provisional application No. 63/281,365, filed on Nov. 19, 2021.

(51) Int. Cl.
*H03H 7/38*    (2006.01)
*H04B 1/50*    (2006.01)
*H04L 5/14*    (2006.01)

(52) U.S. Cl.
CPC ............. *H03H 7/38* (2013.01); *H04B 1/50* (2013.01); *H04L 5/14* (2013.01)

(58) Field of Classification Search
CPC .......... H03H 7/38; H04B 1/50; H04B 1/0057; H04B 1/0458; H04B 1/18; H04B 1/48; H04B 1/525; H04L 5/14
See application file for complete search history.

(56) References Cited

U.S. PATENT DOCUMENTS

| | | | |
|---|---|---|---|
| 2015/0133067 A1* | 5/2015 | Chang | H04B 1/006 455/78 |
| 2017/0063412 A1* | 3/2017 | Ripley | H04B 1/18 |
| 2018/0109283 A1* | 4/2018 | Yokoyama | H04B 1/52 |
| 2019/0334573 A1* | 10/2019 | Thompson | H04B 1/005 |

* cited by examiner

*Primary Examiner* — Sun Jong Kim
(74) *Attorney, Agent, or Firm* — Chang & Hale LLP

(57) ABSTRACT

Front end architectures are described that tailor duplexer characteristics to enable the removal of many of the impedance matching components typically included in a receive signal path between an antenna and receive amplifiers and in a transmit signal path between transmit amplifiers and the antenna. By tailoring duplexer characteristics, targeted impedance matching can be achieved for front end architectures.

20 Claims, 21 Drawing Sheets 20 nH for rotation 30 nH for rotation

Fixed inductor value

REDUCING IMPEDANCE MATCHING COMPONENTS IN FRONT END ARCHITECTURES FOR MULTI-BAND TRANSMIT AND RECEIVE FUNCTIONS

CROSS-REFERENCE TO RELATED APPLICATIONS

This application claims priority to U.S. Provisional Application No. 63/281,365 filed Nov. 19, 2021 and entitled "REDUCING IMPEDANCE MATCHING COMPONENTS IN FRONT END ARCHITECTURES FOR MULTI-BAND TRANSMIT AND RECEIVE FUNCTIONS," which is expressly incorporated by reference herein in its entirety.

BACKGROUND

Field

The present disclosure generally relates to impedance matching in front end architectures for radio-frequency signals.

Description of Related Art

Front end architectures in radio frequency devices are designed to receive and amplify signals in devices such as cellular phones. The performance of these architectures may be affected by a number of factors, including impedance matching. In a typical multi-band front end module (FEM), many impedance matching components are included to enable proper and efficient operation of each frequency band's transmit (TX) and receive (RX) functions. These impedance matching components are typically coupled to a duplexer at an antenna node, a TX node, and a RX node. Typical FEMs include at least one matching inductor at each antenna node and RX node of each duplexer, where a duplexer typically services a particular frequency band. For some frequency bands, a typical FEM may also include at least one matching inductor at the TX node and an additional matching inductor at the RX node of the corresponding duplexers. For example, in a 10-band low-band (LB) module, the total number of components used for impedance matching can be as high as 25 to 35 surface mount technology (SMT) components.

SUMMARY

According to a number of implementations, the present disclosure relates to a front end architecture that includes a plurality of duplexers, each duplexer configured to filter signals within a particular frequency range. The front end architecture also includes a transmission switch coupled to the plurality of duplexers, the transmission switch configured to direct transmission signals to the plurality of duplexers. The front end architecture also includes a plurality of power amplifiers coupled to the transmission switch and to the plurality of duplexers, each duplexer configured to conglomerate transmission signal contours within a target impedance zone.

In some aspects, individual duplexers of the plurality of duplexers include a resonator tuned so that signals within the particular frequency range of that duplexer have a contour within the target impedance zone. In some aspects, the plurality of duplexers are configured to cover an aggregate frequency range that extends from at least 663 MHz to less than or equal to 915 MHz. In some aspects, the plurality of duplexers are configured to cover an aggregate frequency range that includes frequency bands B8, B12, B13, B14, B20, B26, B28A, B28B, B71A, and B71B.

According to a number of implementations, the present disclosure relates to a radio-frequency (RF) front end module that includes a packaging substrate. The RF front end module also includes a plurality of duplexers implemented on the packaging substrate, each duplexer configured to filter signals within a particular frequency range. The RF front end module also includes a transmission switch implemented on the packaging substrate and coupled to the plurality of duplexers, the transmission switch configured to direct transmission signals to the plurality of duplexers. The RF front end module also includes a plurality of power amplifiers implemented on the packaging substrate and coupled to the transmission switch and to the plurality of duplexers, each duplexer configured to conglomerate transmission signal contours within a target impedance zone.

According to a number of implementations, the present disclosure relates to a wireless device that includes a primary antenna. The wireless device also includes a plurality of duplexers, each duplexer configured to filter signals within a particular frequency range. The wireless device also includes a transmission switch coupled to the plurality of duplexers, the transmission switch configured to direct transmission signals to the plurality of duplexers. The wireless device also includes a plurality of power amplifiers coupled to the transmission switch and to the plurality of duplexers, the plurality of power amplifiers configured to amplify transmission signals prior to transmission, each duplexer configured to conglomerate transmission signal contours within a target impedance zone. The wireless device also includes a controller implemented to control the transmission switch and the plurality of power amplifiers to direct the transmission signals to the primary antenna.

According to a number of implementations, the present disclosure relates to a front end architecture that includes a plurality of duplexers, each duplexer including a phase or impedance rotation element and configured to filter signals within a particular frequency range. The front end architecture also includes an antenna switch module coupled to the plurality of duplexers and configured to direct signals between an antenna and the plurality of duplexers. The front end architecture also includes a single shunt inductor between the antenna switch module and the antenna, the single shunt inductor configured to provide impedance matching to the plurality of duplexers without the use of additional shunt inductors between the plurality of duplexers and the antenna switch module.

In some aspects, individual duplexers of the plurality of duplexers include the phase or impedance rotation element at an antenna node of the individual duplexer. In some aspects, individual duplexers of the plurality of duplexers further include an embedded trace to further provide impedance matching to enable impedance matching using the single shunt inductor. In some aspects, individual duplexers of the plurality of duplexers include the phase or impedance rotation element on each of a RX filter and a TX filter of the individual duplexer. individual duplexers of the plurality of duplexers further include an embedded trace to further provide impedance matching to enable impedance matching using the single shunt inductor. In some aspects, individual duplexers of the plurality of duplexers further include a RX embedded trace as part of a RX filter path of the RX filter and a TX embedded trace as part of a TX filter path of the TX filter.

According to a number of implementations, the present disclosure relates to a radio-frequency (RF) front end module that includes a packaging substrate. The RF front end module also includes a plurality of duplexers implemented on the packaging substrate, each duplexer including a phase or impedance rotation element and configured to filter signals within a particular frequency range. The RF front end module also includes an antenna switch module implemented on the packaging substrate, the antenna switch module coupled to the plurality of duplexers and configured to direct signals between an antenna and the plurality of duplexers. The RF front end module also includes a single shunt inductor implemented on the packaging substrate, the single shunt inductor coupled between the antenna switch module and the antenna, the single shunt inductor configured to provide impedance matching to the plurality of duplexers without the use of additional shunt inductors between the plurality of duplexers and the antenna switch module.

According to a number of implementations, the present disclosure relates to a wireless device that includes a primary antenna. The wireless device also includes a plurality of duplexers, each duplexer including a phase or impedance rotation element and configured to filter signals within a particular frequency range. The wireless device also includes an antenna switch module coupled to the plurality of duplexers and configured to direct signals between an antenna and the plurality of duplexers. The wireless device also includes a single shunt inductor between the antenna switch module and the antenna, the single shunt inductor configured to provide impedance matching to the plurality of duplexers without the use of additional shunt inductors between the plurality of duplexers and the antenna switch module. The wireless device also includes a controller implemented to control the antenna switch module to direct the radio frequency signals between the plurality of duplexers and the primary antenna.

According to a number of implementations, the present disclosure relates to a front end architecture that includes a plurality of duplexers, each duplexer configured to filter signals within a particular frequency range and to conglomerate receive signal contours. The front end architecture also includes a plurality of low noise amplifiers (LNAs), each LNA configured to amplify receive signals corresponding to a particular frequency range. The front end architecture also includes a first LNA switch coupled to the plurality of duplexers, the first LNA switch configured receive signals from the plurality of duplexers. The front end architecture also includes a second LNA switch coupled to the first LNA and configured to direct signals to the plurality of LNAs for amplification. The front end architecture also includes a LNA shunt inductor coupled to a signal path between the first LNA switch and the second LNA switch, the LNA shunt inductor configured to rotate the conglomerated receive signal contours into a target LNA noise circle.

In some aspects, individual duplexers of the plurality of duplexers include a resonator tuned so that signals within the particular frequency range of that duplexer are conglomerated into the target LNA noise circle after being impedance rotated by the LNA shunt inductor. In some aspects, the tuned resonator of the individual duplexer includes a first receive resonator of an receive filter. In some aspects, the LNA shunt inductor includes two high quality factor inductors coupled in parallel. In some aspects, the LNA shunt inductor is configured to rotate the conglomerated receive signal contours without additional impedance matching components between the plurality of duplexers and the first LNA switch. In some aspects, the LNA shunt inductor is configured to rotate the conglomerated receive signal contours without additional impedance matching components between the second LNA switch and the plurality of LNAs.

According to a number of implementations, the present disclosure relates to a radio-frequency (RF) front end module that includes a packaging substrate. The RF front end module also includes a plurality of duplexers implemented on the packaging substrate, each duplexer configured to filter signals within a particular frequency range and to conglomerate receive signal contours. The RF front end module also includes a plurality of low noise amplifiers (LNAs) implemented on the packaging substrate, each LNA configured to amplify receive signals corresponding to a particular frequency range. The RF front end module also includes a first LNA switch implemented on the packaging substrate, the first LNA switch coupled to the plurality of duplexers, the first LNA switch configured receive signals from the plurality of duplexers. The RF front end module also includes a second LNA switch implemented on the packaging substrate, the second LNA switch coupled to the first LNA and configured to direct signals to the plurality of LNAs for amplification. The RF front end module also includes a LNA shunt inductor implemented on the packaging substrate, the LNA shunt inductor coupled to a signal path between the first LNA switch and the second LNA switch, the LNA shunt inductor configured to rotate the conglomerated receive signal contours into a target LNA noise circle.

According to a number of implementations, the present disclosure relates to a wireless device that includes a primary antenna. The wireless device also includes a plurality of duplexers, each duplexer configured to filter signals within a particular frequency range and to conglomerate receive signal contours. The wireless device also includes a plurality of low noise amplifiers (LNAs), each LNA configured to amplify receive signals corresponding to a particular frequency range. The wireless device also includes a first LNA switch coupled to the plurality of duplexers, the first LNA switch configured receive signals from the plurality of duplexers. The wireless device also includes a second LNA switch coupled to the first LNA and configured to direct signals to the plurality of LNAs for amplification. The wireless device also includes a LNA shunt inductor coupled to a signal path between the first LNA switch and the second LNA switch, the LNA shunt inductor configured to rotate the conglomerated receive signal contours into a target LNA noise circle. The wireless device also includes a controller implemented to control the first LNA switch, the second LNA switch, and the plurality of LNAs to amplify signals received at the primary antenna.

According to a number of implementations, the present disclosure relates to a front end architecture that includes a plurality of duplexers, each duplexer including a phase or impedance rotation element, each duplexer configured to filter signals within a particular frequency range, each duplexer configured to conglomerate transmission signal contours within a target impedance zone and to conglomerate receive signal contours. The front end architecture also includes a transmission switch coupled to the plurality of duplexers, the transmission switch configured to direct transmission signals to the plurality of duplexers. The front end architecture also includes an antenna switch module coupled to the plurality of duplexers and configured to direct signals between an antenna and the plurality of duplexers. The front end architecture also includes a single shunt inductor between the antenna switch module and the antenna, the single shunt inductor configured to provide impedance matching to the plurality of duplexers without the use of additional shunt inductors between the plurality of duplexers and the antenna switch module. The front end architecture also includes a first low noise amplifier (LNA) switch coupled to the plurality of duplexers, the first LNA switch configured receive signals from the plurality of duplexers. The front end architecture also includes a second LNA switch coupled to the first LNA and configured to direct signals to a plurality of LNAs for amplification. The front end architecture also includes a LNA shunt inductor coupled to a signal path between the first LNA switch and the second LNA switch, the LNA shunt inductor configured to rotate the conglomerated receive signal contours into a target LNA noise circle.

In some aspects, impedance matching is provided without additional impedance matching components.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

DETAILED DESCRIPTION OF SOME EMBODIMENTS

Figure 1:
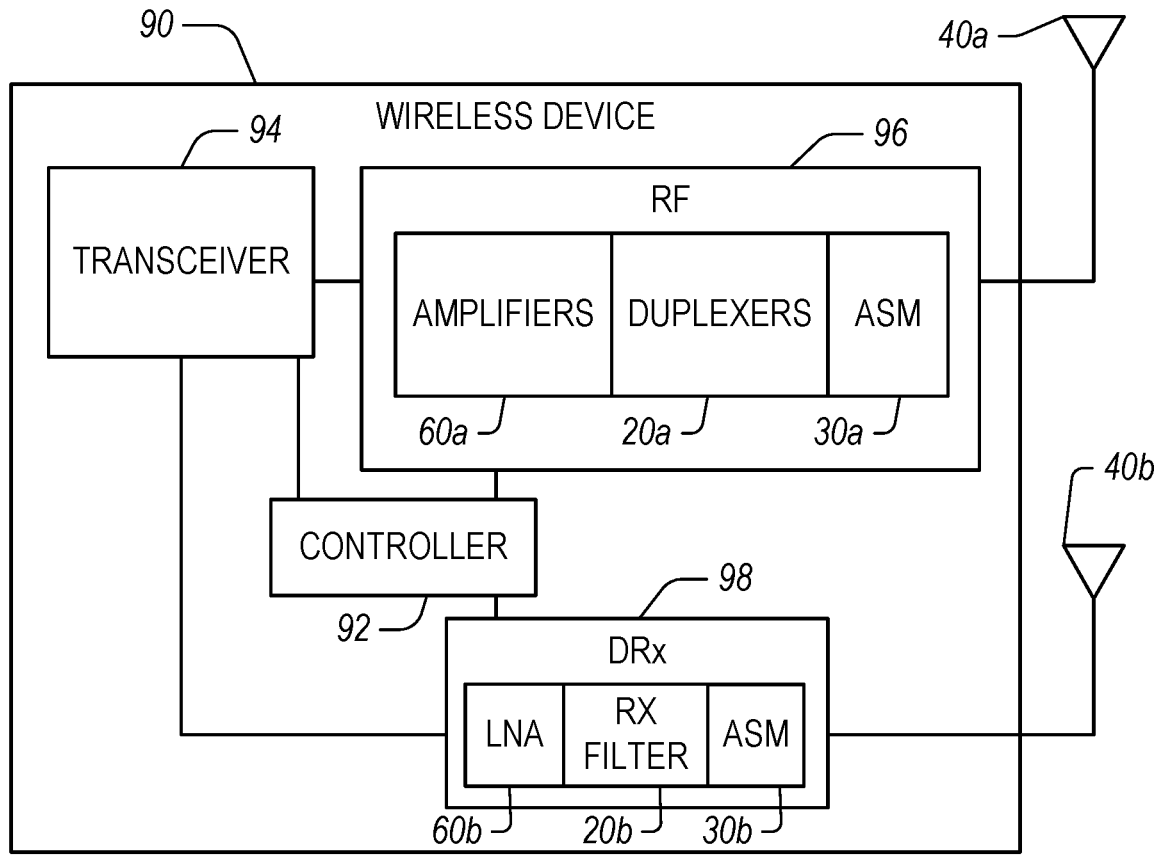
FIG. 1 illustrates a wireless device having a primary antenna and a diversity antenna.

The headings provided herein, if any, are for convenience only and do not necessarily affect the scope or meaning of the claimed invention.

Described herein are front end architectures that tailor duplexer characteristics to enable the removal of many of the impedance matching components typically included in a receive signal path between an antenna and receive amplifiers and in a transmit signal path between transmit amplifiers and the antenna. By tailoring duplexer characteristics, targeted impedance matching can be achieved for the front end architecture. This enables the front end architecture to impedance match without including typical impedance matching components along a signal path between the antenna and an amplifier. This can be implemented on the transmit signal path (e.g., between a power amplifier (PA) and the antenna), on the receive signal path (e.g., between the antenna and a low noise amplifier (LNA)), or both the transmit signal path and the receive signal path. Thus, the disclosed front end architectures are configured to reduce or eliminate the number of components required for impedance matching.

In a typical multi-band front end module (FEM), many impedance matching components are included to enable proper and efficient operation of each frequency band's transmit (TX) and receive (RX) functions. These impedance matching components are typically coupled to a duplexer at an antenna node, a TX node, and a RX node. Typical FEMs include at least one matching inductor at each antenna node and RX node of each duplexer, where a duplexer typically services a particular frequency band. For some frequency bands, a typical FEM may also include at least one matching inductor at the TX node and an additional matching inductor at the RX node of the corresponding duplexers. For example, in a 10-band low-band (LB) module, the total number of components used for impedance matching can be as high as 25 to 35 surface mount technology (SMT) components.

The disclosed systems enable the reduction of the number of impedance matching components. In some embodiments, the disclosed technologies can enable the removal of all but two matching inductors to operate the transmit and receive functions for the frequency bands serviced by the FEM. The disclosed systems enable this reduction through a combination of adjusting the characteristics and behavior of the duplexers and the inclusion of additional switch modules in the receive signal path.

Advantageously, the disclosed systems reduce the cost of FEMs, reduce the required space for impedance matching components on the FEM boards, and/or reduce the size of the FEM boards. In some embodiments, there is no need for TX, RX, and antenna matching components for each duplexer due at least in part to the impedance matching being accomplished without such components or the impedance matching being accomplished by a single impedance matching component for the serviced frequency bands. The disclosed systems can advantageously be used for different PA architectures including, for example and without limitation, class E, class AB, and pull-pull. The disclosed systems can advantageously be used for different LNA architectures such as a shared LNA or a dedicated LNA for each frequency band.

Wireless Devices and Front End Modules with Tuned NF Performance

FIG. 1 illustrates a wireless device 90 having a primary antenna 40a and a diversity antenna 40b. The wireless device 90 includes an RF module 96 and a transceiver 94 that may be controlled by a controller 92. The transceiver 94 is configured to convert between analog signals (e.g., radio-frequency (RF) signals) and digital data signals. To that end, the transceiver 94 may include a digital-to-analog converter, an analog-to-digital converter, a local oscillator for modulating or demodulating a baseband analog signal to or from a carrier frequency, a baseband processor that converts between digital samples and data bits (e.g., voice or other types of data), or other components.

The RF module 96 is coupled between the primary antenna 40a and the transceiver 94. Because the RF module 96 may be physically close to the primary antenna 40a to reduce attenuation due to cable loss, the RF module 96 may be referred to as a front-end module (FEM). The RF module 96 may perform processing on an analog signal received from the primary antenna 40a for the transceiver 94 or received from the transceiver 94 for transmission via the primary antenna 40a. To that end, the RF module 96 includes an antenna switch module (ASM) 30a, one or more duplexers 20a, one or more amplifiers 60a (including power amplifiers (PAS) and low noise amplifiers (LNAs)) and may also include amplifier switches, band select switches, attenuators, matching circuits, multiplexers, and other components. The ASM 30a may be connected to a plurality of duplexers 20a to enable operation across a plurality of frequency bands. A signal for transmission can be sent from the transceiver 94 through the RF module 96, being amplified by an amplifier 60a (e.g., a PA), filtered by a duplexer 20a, and coupled to the primary antenna 40a via the ASM 30a. A signal received at the antenna 40a can be sent through the RF module 96, being connected to a duplexer 20a via the ASM 30a, being filtered by the duplexer 20a, and being amplified by an amplifier 60a (e.g., a LNA) before being sent to the transceiver 94.

The controller 92 can be configured to generate and/or send control signals to other components of the wireless device 90. The controller 92 can be configured to receive signals from other components of the wireless device 90 to process to determine control signals to send to other components. In some embodiments, the controller 92 can be configured to analyze signals or data to determine control signals to send to other components of the wireless device 90.

When a signal is transmitted to the wireless device 90, the signal may be received at both the primary antenna 40a and the diversity antenna 40b. The primary antenna 40a and diversity antenna 40b may be physically spaced apart such that the signal at the primary antenna 40a and diversity antenna 40b is received with different characteristics. For example, the primary antenna 40a and the diversity antenna 40b may receive the signal with different attenuation, noise, frequency response, and/or phase shift. The transceiver 94 may use both of the signals with different characteristics to determine data bits corresponding to the signal. In some implementations, the transceiver 94 selects from between the primary antenna 40a and the diversity antenna 40b based on the characteristics, such as selecting the antenna with the highest signal-to-noise ratio. In some implementations, the transceiver 94 combines the signals from the primary antenna 40a and the diversity antenna 40b to increase the signal-to-noise ratio of the combined signal. In some implementations, the transceiver 94 processes the signals to perform multiple-input/multiple-output (MiMo) communication.

Because the diversity antenna 40b is physically spaced apart from the primary antenna 40a, the diversity antenna 40b can be coupled to the transceiver 94 by a transmission line, such as a cable or a printed circuit board (PCB) trace. In some implementations, the transmission line is lossy and attenuates the signal received at the diversity antenna 40b before it reaches the transceiver 94. Thus, in some implementations, gain is applied to the signal received at the diversity antenna 40b. The gain (and other analog processing, such as filtering) may be applied by the diversity receiver module 98. Because such a diversity receiver module 98 may be located physically close to the diversity antenna 40b, it may be referred to as a diversity receiver front-end module (DRx). The DRx module 98 includes components similar to the RF module 96, such as an ASM 30b, an RX filter 20b, and a LNA 60b. Accordingly, each of the RF module 96 and the DRx module 98 include a receive path (or a signal path for received signals) from a corresponding antenna 40a, 40b to a corresponding amplifier 60a, 60b that passes through a duplexer or filter 20a, 20b.

The RF module 96 and the diversity receiver module 98 are examples of front end modules that incorporate the front end architectures described herein. These FEMs incorporate the configurations that enable the reduction of the number of impedance matching components in the front end. As described herein, the disclosed front end architectures enable the removal of many of the impedance matching components typically included in a receive signal path between an antenna 40a, 40b and receive amplifiers 60a, 60b and in a transmit signal path between transmit amplifiers 60a and the antenna 40a.

Conglomerating Transmission Contours

In some embodiments, front end architectures are configured to conglomerate transmission contours to reduce or to eliminate the number of components required for impedance matching. The disclosed front end architectures are configured to conglomerate transmission contours so that the power amplifiers (PAs) have a better or preferable (e.g., easier) impedance to match.

As used herein, transmission contours can include the contours of transmission signals plotted on a Smith chart. Thus, conglomerating transmission contours can include tailoring one or more components in the transmission signal path so that the contours of transmission signals, e.g., on a Smith chart, are grouped relatively tightly together. Tightly grouped transmission contours are advantageous because they are easier for a power amplifier to match across a wide range of frequency bands.

Inside front end architectures where the PA is cascaded with follow-on components (e.g., a transmission or TX switch and several duplexers), the PA can only impedance match well to certain frequency bands due to its impedance being confined within a small range. To improve TX performance for a wider range of frequency bands, typically a TX matching network is included for each duplexer to transform the PA impedance for the power amplifier. By way of example, in a 10-band frond end module, if half of the frequency bands need this matching network, it will require an additional 5 to 10 extra SMTs to achieve that goal. This approach not only increases the cost of the module, but it also makes it difficult to fit all these extra SMTs onto an already crowded module. Thus, the disclosed front end architectures reduce or eliminate the need for these SMTs, not only to achieve good electrical performance for all frequency bands, but to also reduce costs and to use less space.

Typically, front end architectures use several PAs such that each PA can match into a single frequency band. This method not only uses larger Heterojunction Bipolar Transistor (HBT) dies but also uses an impedance matching network for each band, which uses a lot of SMTs. Other approaches use two PAS with a switching option where the first PA matches certain frequencies or frequency bands and the second PA a slightly different frequency range. But this solution sometimes still needs additional matching components for certain frequency bands if the duplexer TX contour is shifted away from a suitable PA matching zone.

Accordingly, the disclosed front end architectures are configured to conglomerate duplexer TX contours into a specific or targeted region. This enables the PA to match a larger number of frequency bands without the help of additional matching networks. The disclosed architectures are advantageous because they reduce the number of SMTs required for radio-frequency (RF) modules, such as front end modules, power amplifier modules, and the like. The disclosed architectures are also advantageous because they improve performance of the modules across a wider range of frequency bands.

The disclosed architectures can be configured to conglomerate TX contours using a variety of methods. For example, the duplexers can be designed so that the resulting TX contour for each duplexer is within a target impedance zone. The target impedance zone can be one that enables superior operation of the PA. In addition, where duplexers are limited and/or cannot be designed so that the resulting TX contour is within the target impedance zone, a shunt capacitor can be used to move the TX contour to the target impedance zone. These shunt capacitors can be preferable to other SMT capacitors because the shunt capacitors can be realized and integrated at the output of the TX switch for these particular frequency bands. The disclosed architectures advantageously achieve similar or superior performance to architectures that use more components for impedance matching. Thus, the disclosed architectures achieve comparable performance with reduced cost and complexity. In addition, the disclosed architectures advantageously free up space on the module for other components or to allow the size of the module to be reduced. Decreasing the size of the module advantageously further reduces costs.

The disclosed architectures advantageously remove the need for matching networks and save on costs by removing SMTs that would otherwise be included for impedance matching. As a particular example, the disclosed architectures can enable the removal of between 5-10 SMTs from a module. Likewise, the disclosed architectures require less space due to the removal of unnecessary SMTs. The disclosed architectures can be applied to various PA architectures such as class E, class AB, pull-pull, or the like.

Figure 2:
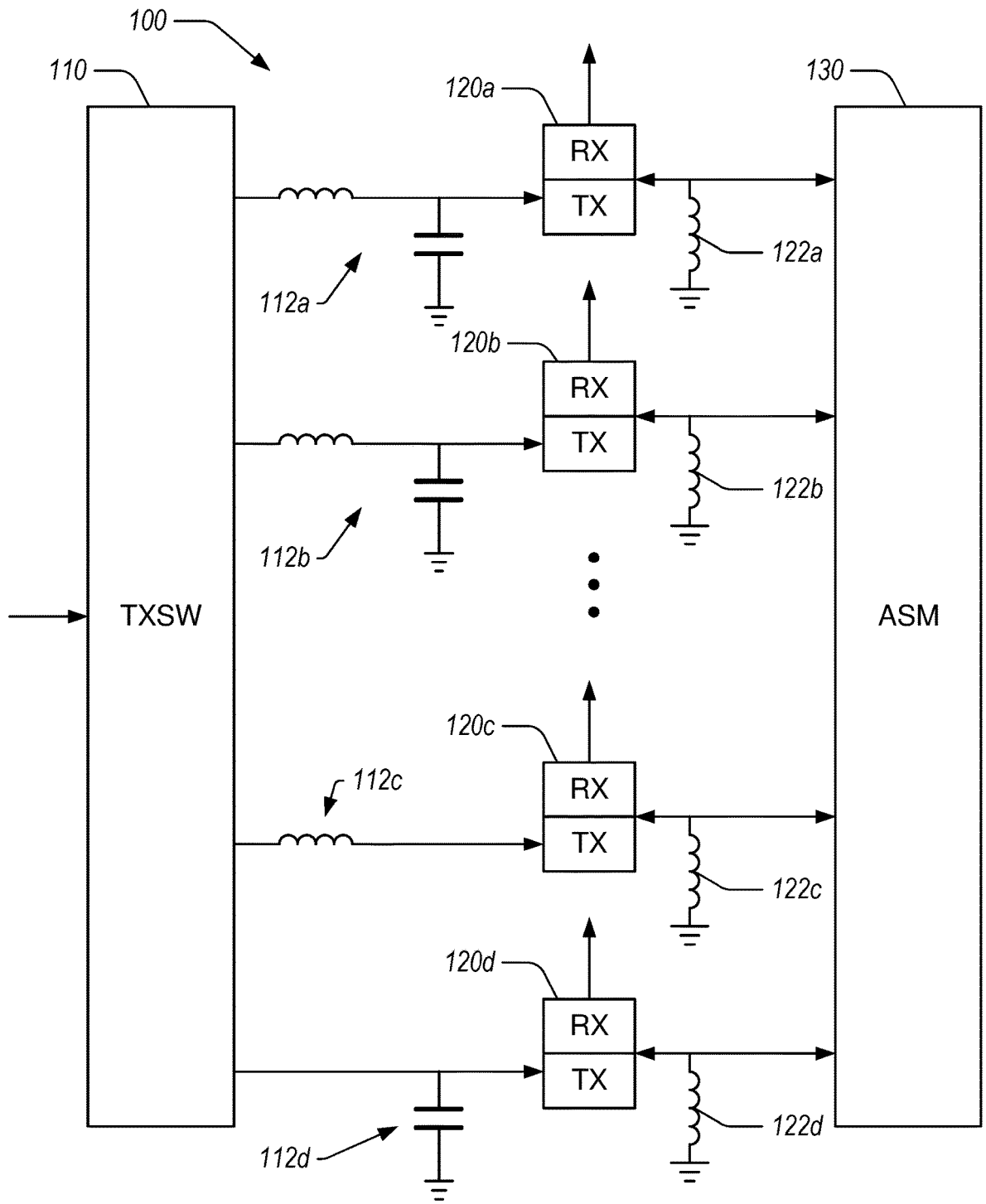
FIG. 2 illustrates a traditional approach to impedance matching in a front end architecture.

FIG. 2 illustrates a traditional approach to impedance matching in a front end architecture 100. The front end architecture 100 includes a transmission switch 110 that directs transmission signals through matching networks 112a-112d to duplexers 120a-120d. The front end architecture 100 includes shunt inductors 122a-122d between the duplexers 120a-120d and an antenna switch module (ASM) 130. The matching networks 112a-112d include inductors, shunt capacitors, or a combination of inductors and shunt capacitors.

Figure 3:
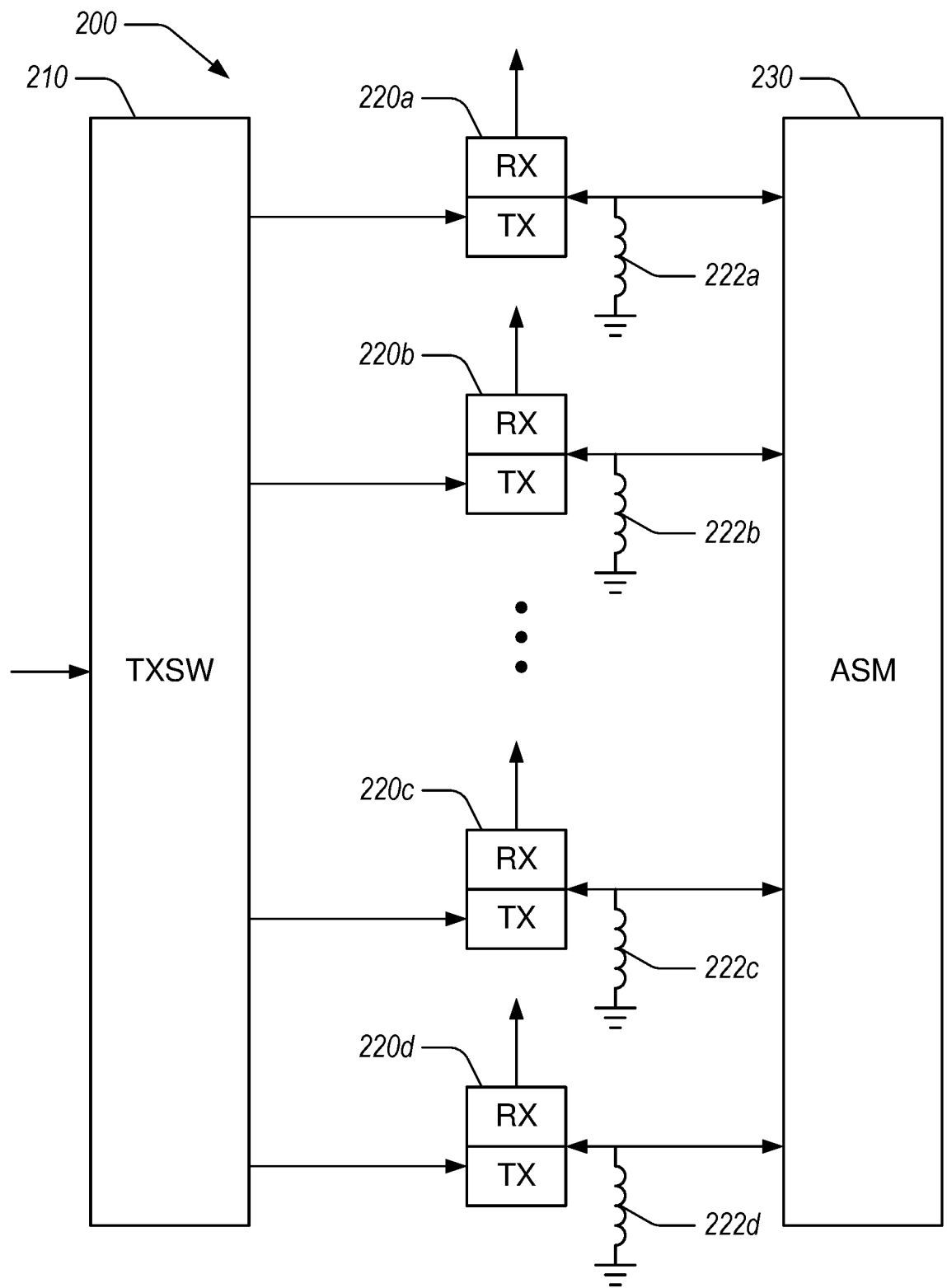
FIG. 3 illustrates an example embodiment of a front end architecture that enables the removal of the matching networks of the front end architecture of FIG. 2.

In comparison, FIG. 3 illustrates an example embodiment of a front end architecture 200 that enables the removal of the matching networks 112a-112d of the front end architecture 100 of FIG. 2. Between the transmission switch 210 and the duplexers 220a-220d, there are no inductors. Thus, the front end architecture 200 enables the removal of all TX matching networks at the duplexer TX input.

In the traditional approach (e.g., the front end architecture of FIG. 1), a typical module would include a total of about 14 TX matching SMTs as part of the package. With the disclosed approach (e.g., the front end architecture of FIG. 2), a module would remove the 14 TX matching SMTs, resulting in a significant cost saving, reduction in complexity, and reduction in required space on the module.

Figure 4A:
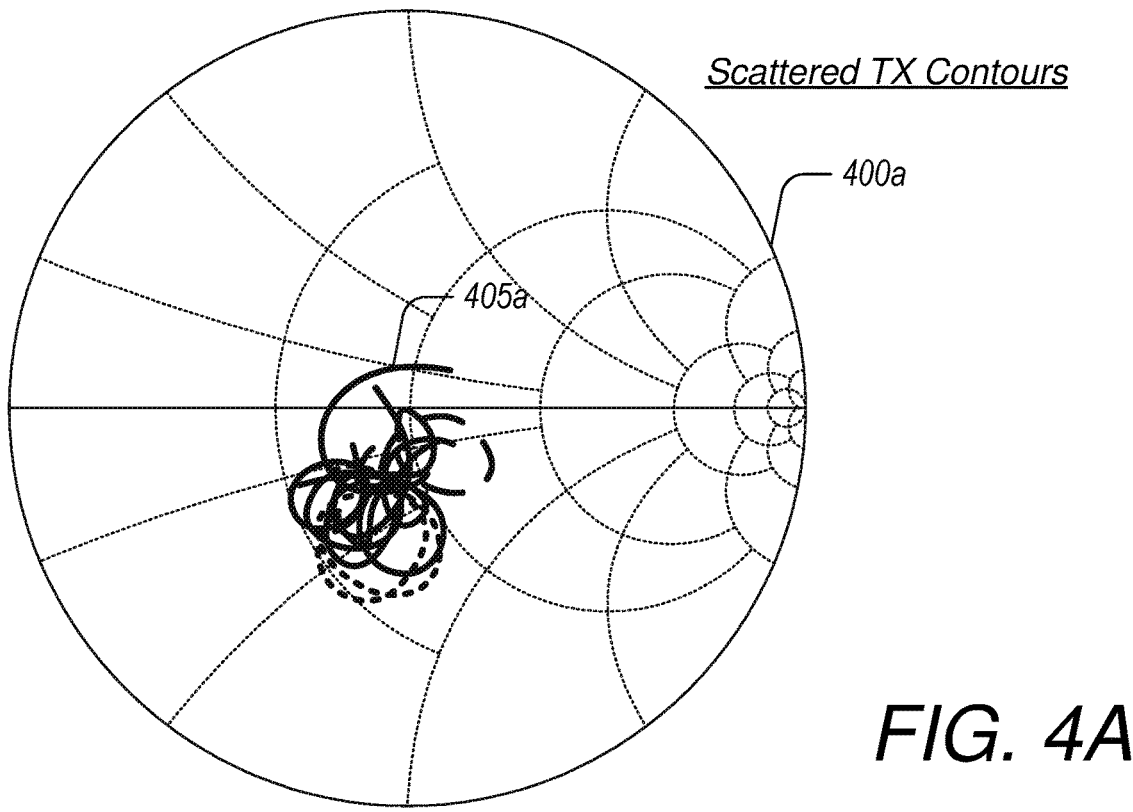
FIG. 4A illustrates TX contours on a Smith chart for a typical front end architecture.

FIG. 4A illustrates TX contours 405a on a Smith chart 400a for a typical front end architecture (e.g., the front end architecture 100 of FIG. 2). The TX contours 405a are scattered and are difficult to impedance match for the power amplifiers. Thus, some frequency bands may be impedance matched while others are not. This results in the addition of impedance matching components, such as the impedance matching networks 112a-112d.

Figure 4B:
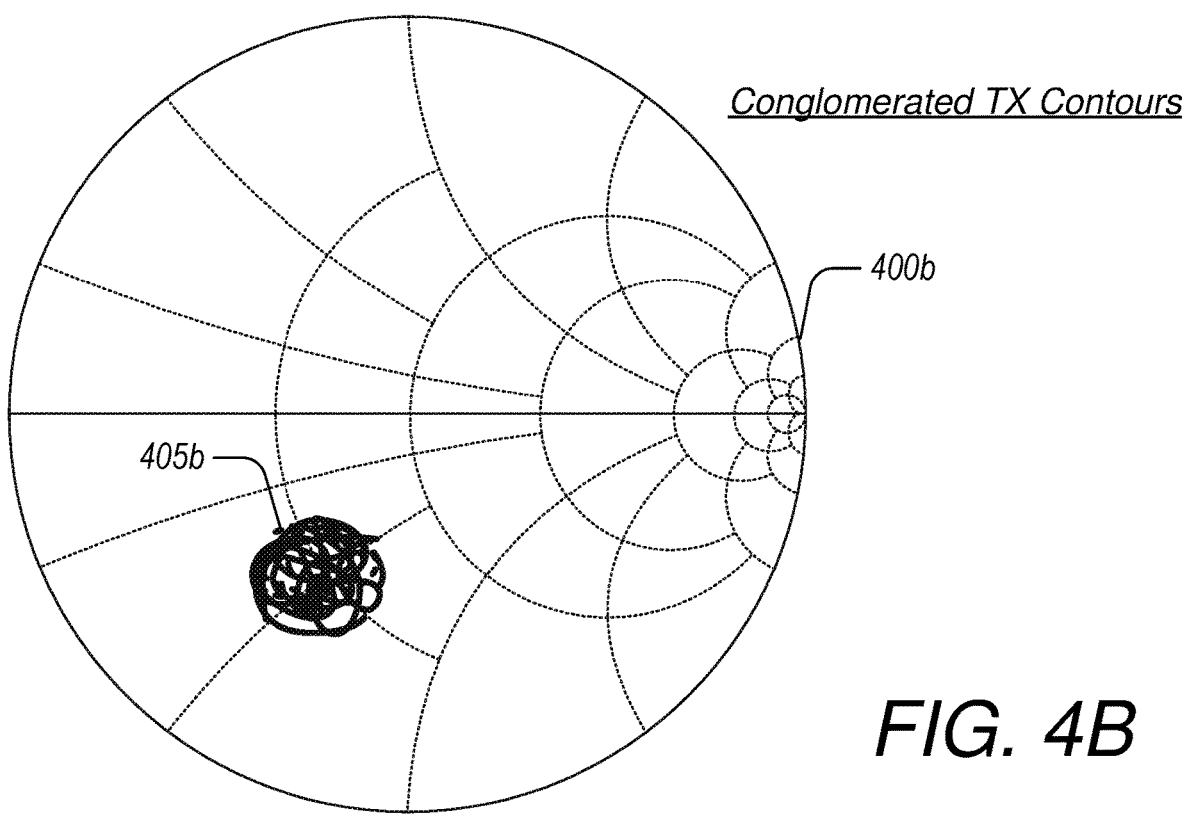
FIG. 4B illustrates TX contours on a Smith chart for the front end architectures disclosed herein.

In contrast, FIG. 4B illustrates TX contours 405b on a Smith chart 400b for the front end architectures disclosed herein (e.g., the front end architecture 200 of FIG. 3). The TX contours 405b are conglomerated providing a better impedance for the power amplifier to match.

In the plots of FIGS. 4A and 4B, the frequencies of the signals range from 663 MHz to 915 MHz. The frequency bands of the TX contours correspond to frequency bands B8, B12, B13, B14, B20, B26, B28A, B28B, B71A, B71B.

Thus, the disclosed front end architectures conglomerate duplexer TX contours into a target impedance zone so that the PA can match to all frequency bands of the front end architecture without additional matching components prior to the duplexers.

Figure 5:
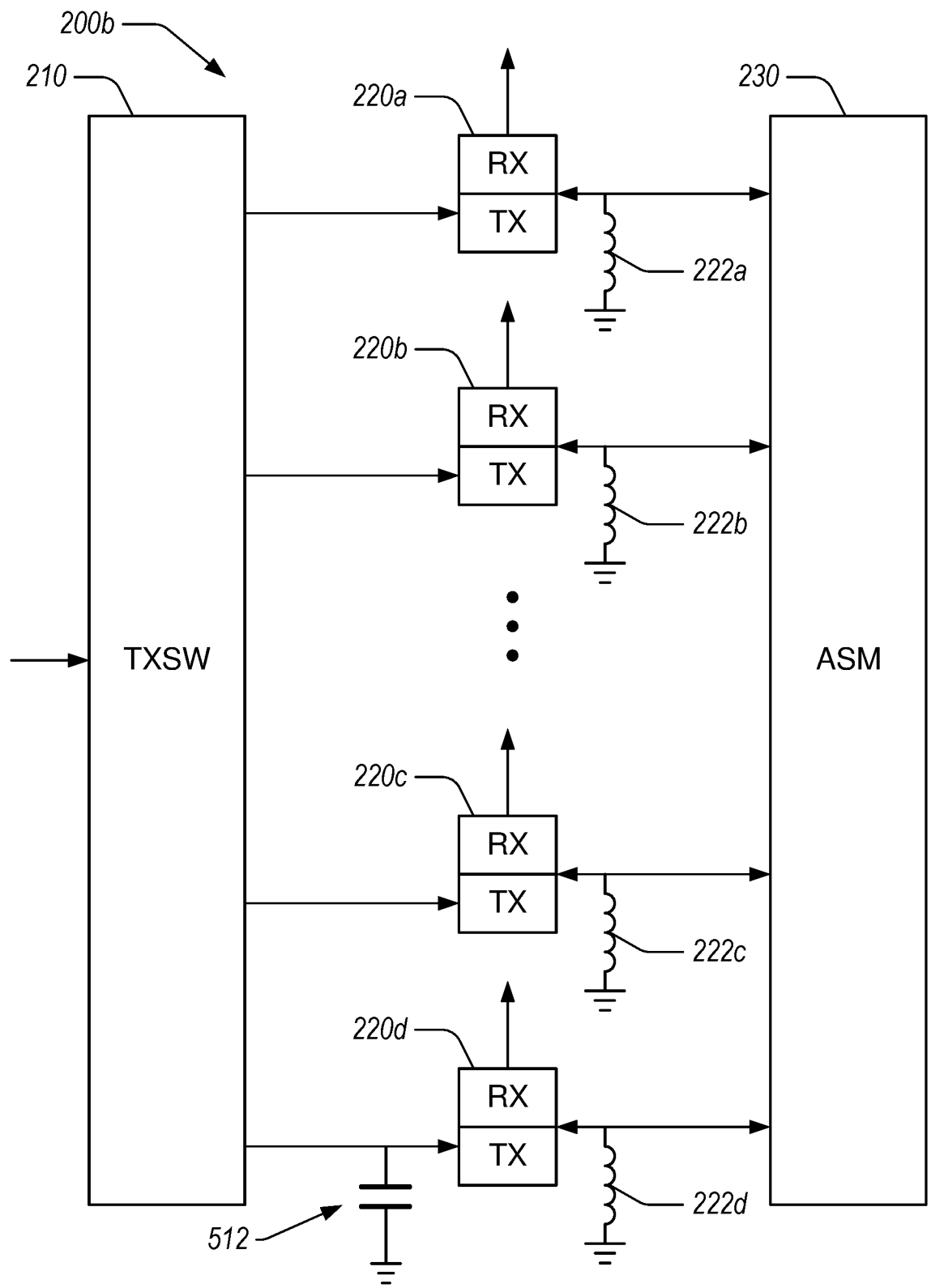
FIG. 5 illustrates an example front end architecture that is identical to the front end architecture of FIG. 3 with the addition of a shunt capacitor for a particular frequency band.

FIG. 5 illustrates an example front end architecture 200b that is identical to the front end architecture 200 of FIG. 3 with the addition of a shunt capacitor 512 for a particular frequency band. In some embodiments, some frequency bands may be problematic for a duplexer to rotate into the target impedance zone. For these frequency bands, the shunt capacitor 512 can be added at the output of the TX switch 210. Additional shunt capacitors can be added in the same way for other frequency bands to rotate the TX contours of these frequency bands into the target impedance zone.

The TX filter of the duplexer is the load that the PA sees, so the disclosed front end architectures use duplexers that present a load that is compatible with the PA. Because the duplexers present this targeted load, the need for additional matching components is reduced or eliminated.

Accordingly, each duplexer of the disclosed front end architectures is configured to filter signals within a particular frequency range and to present a targeted load to the PA associated with the duplexer. The front end architectures can include a plurality of power amplifiers coupled to the transmission switch and to the plurality of duplexers, each duplexer configured to conglomerate transmission signal contours within a target impedance zone.

Figure 6:
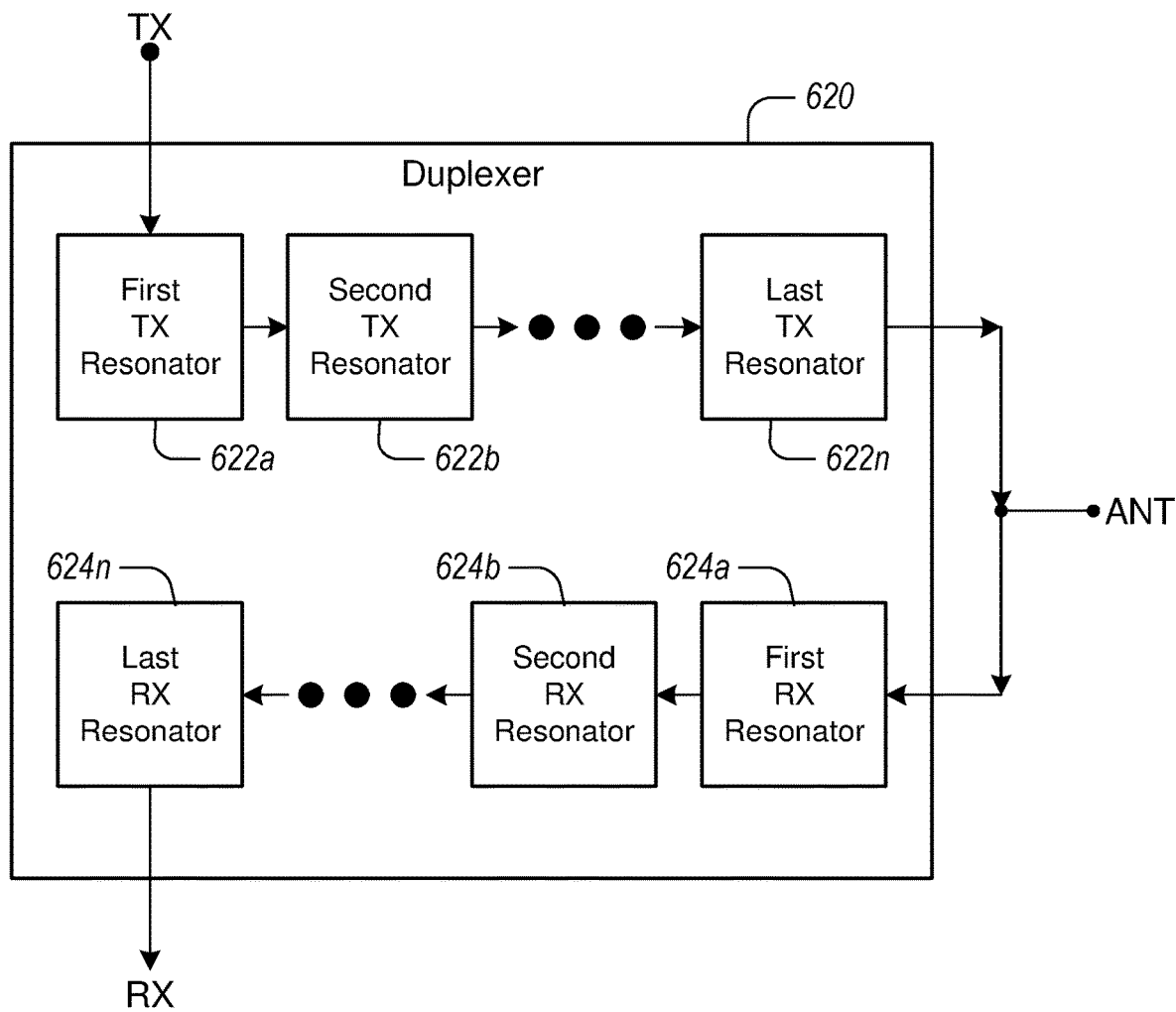
FIG. 6 illustrates an example duplexer that enables the disclosed front end architectures to remove certain matching networks between the TX switch and the duplexers.

FIG. 6 illustrates an example duplexer 620 that enables the disclosed front end architectures to remove certain matching networks between the TX switch and the duplexers. The duplexer 620 adjusts characteristics of the TX resonators 622a to 622n between the antenna (ANT) and the TX ports. In some embodiments, the first TX resonator 622a is adjusted to achieve a desired impedance location for the TX contours. In some embodiments, the duplexer 620 comprises SAW resonators and/or acoustic filters.

Accordingly, the disclosed front end architectures include duplexers that have resonators that have been configured to present a targeted impedance for the PA to enable the removal of matching networks between the duplexers and the TX switch. Each duplexer is thus tuned for an individual frequency band or a particular frequency range. Thus, the duplexers of the disclosed front end architectures have custom-tuned impedances.

Single Inductor at the Antenna to Match all Frequency Bands

In some embodiments, front end architectures include duplexers that are configured to provide targeted impedance matching which allows the use of a single inductor rather than dedicated inductors for each duplexer. The duplexers are configured to implement phase or impedance rotation elements to provide a targeted phase or impedance rotation. In addition, the front end architectures can implement embedded traces in the duplexers that aid in providing the targeted phase or impedance rotation.

Figure 7:
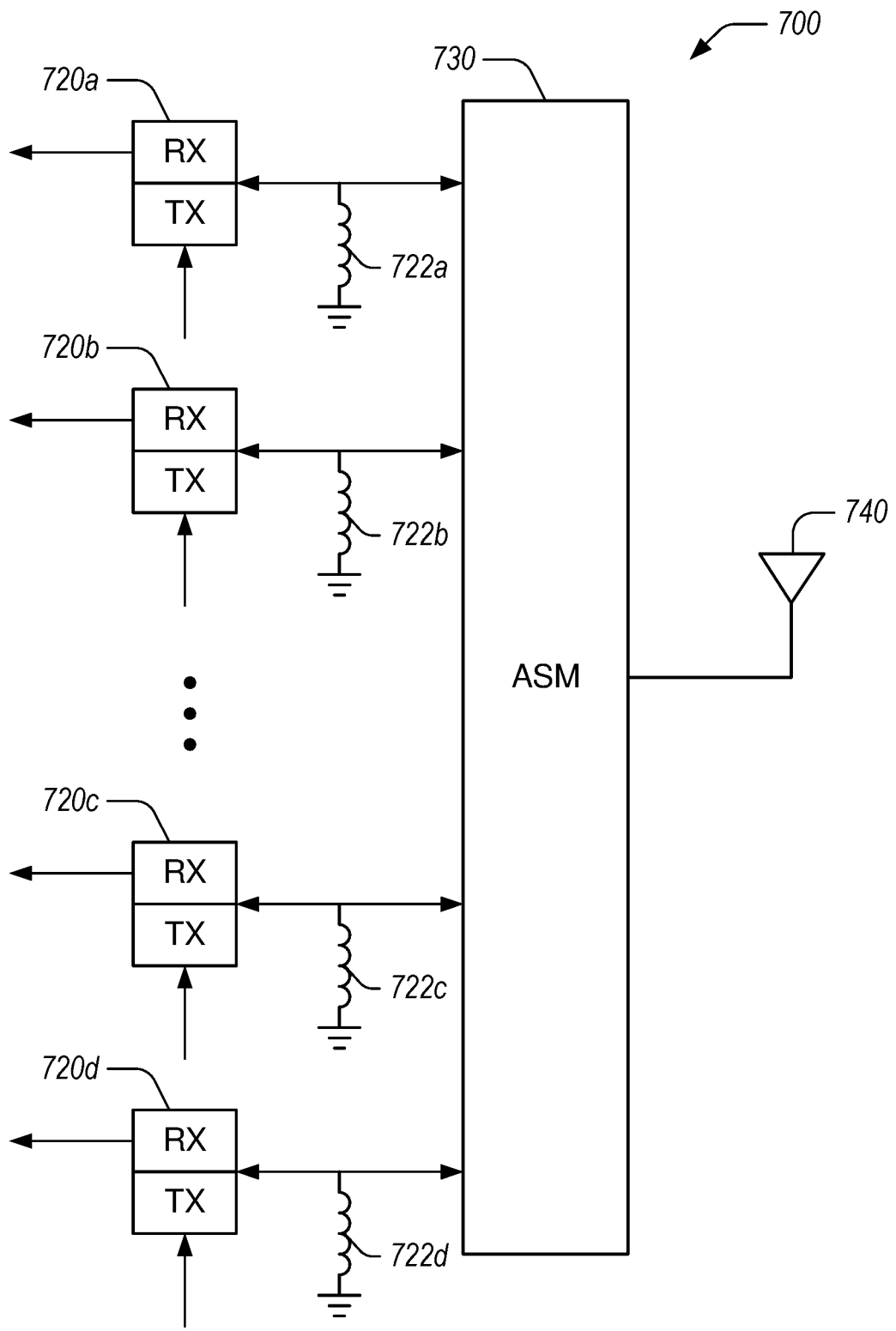
FIG. 7 illustrates an example of a typical front end architecture that includes an antenna switch module (ASM) next to an antenna.

FIG. 7 illustrates an example of a typical front end architecture 700 that includes an antenna switch module (ASM) 730 next to an antenna 740. The ASM 730 is connected to a plurality of duplexers 720a-720d that enables operation across a plurality of frequency bands. A shunt antenna inductor 722a-722d is included between each duplexer 720a-720d and the ASM 730 to enable proper function across the plurality of frequency bands. Due to frequency differences for each frequency band, the inductance values of the shunt inductors 722a-722d are typically different for each frequency band. By way of example, in a low-band (LB) module with 10 duplexers, typically 10 different inductor values are required to provide proper impedance matching. These inductors occupy valuable space on the front end module as well as increase the cost of the module.

Other approaches may attempt to reduce the number of matching shunt inductors at the antenna by using switching solutions. For example, inductors may be coupled to a switch such as the ASM and switching may be used to adjust the impedance between the duplexers and the antenna by switching inductors in and out of the signal path. These switching solutions thus toggle between different inductor values for duplexers that use similar inductor values. However, these approaches introduce extra loss due to switching losses and add complexity to the ASM design.

Accordingly, the disclosed front end architectures utilize re-designed duplexers that enable the use of a single shunt inductor at the antenna to impedance match the plurality of frequency bands. There are several duplexer architectures disclosed herein that enable the use of a single shunt inductor between the ASM and the antenna, examples of which are described herein.

Figure 8:
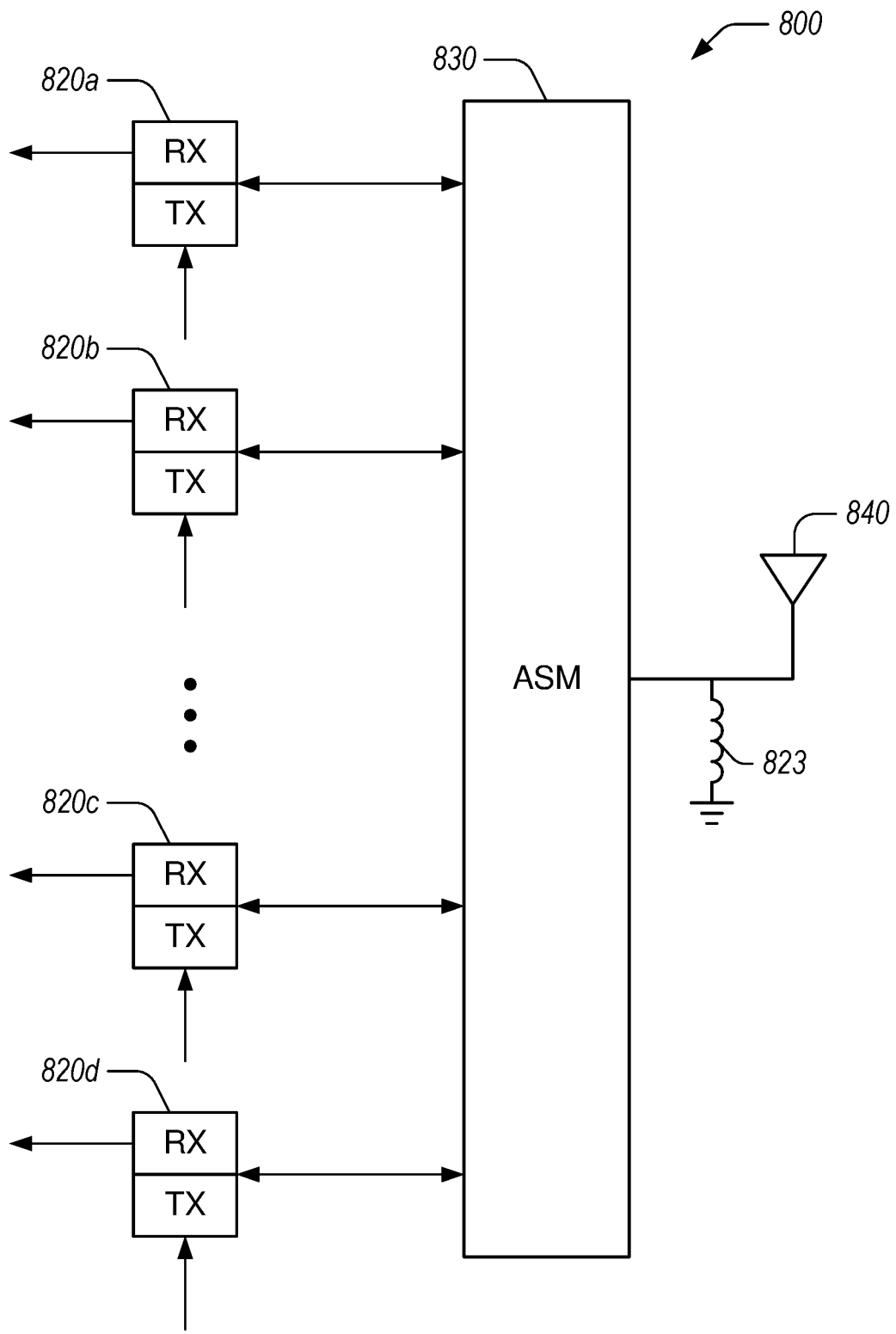
FIG. 8 illustrates an example front end architecture that implements a single shunt inductor between an ASM and an antenna.

FIG. 8 illustrates an example front end architecture 800 that implements a single shunt inductor 823 between an ASM 830 and an antenna 840. The front end architecture 800 includes a plurality of duplexers 820a-820d that do not include shunt inductors between the plurality of duplexers and the ASM 830. The single shunt inductor 823 is configured to provide proper impedance matching to the plurality of duplexers 820a-820d due at least in part to the design of the individual duplexers. In particular, each duplexer is configured to add a phase or impedance rotation element such that it enables the use of the single shunt inductor 823 to provide proper impedance matching. Proper impedance matching can be achieved without the use of additional shunt inductors between the plurality of duplexers and the antenna or between the plurality of duplexers and the ASM. In some embodiments, embedded traces can be implemented as part of the duplexers to assist in providing the targeted phase or impedance rotation. For example, traces in a front end module or other module can introduce inductance and/or capacitance and the traces can be designed to provide targeted inductance and/or capacitance. Similarly, the phase or impedance rotation components of the duplexers can be tuned along with the inductance and/or capacitance of the traces to provide targeted impedance rotations for different frequency bands. Examples of the various duplexer designs are described with respect to FIGS. 9-11.

Figure 9:
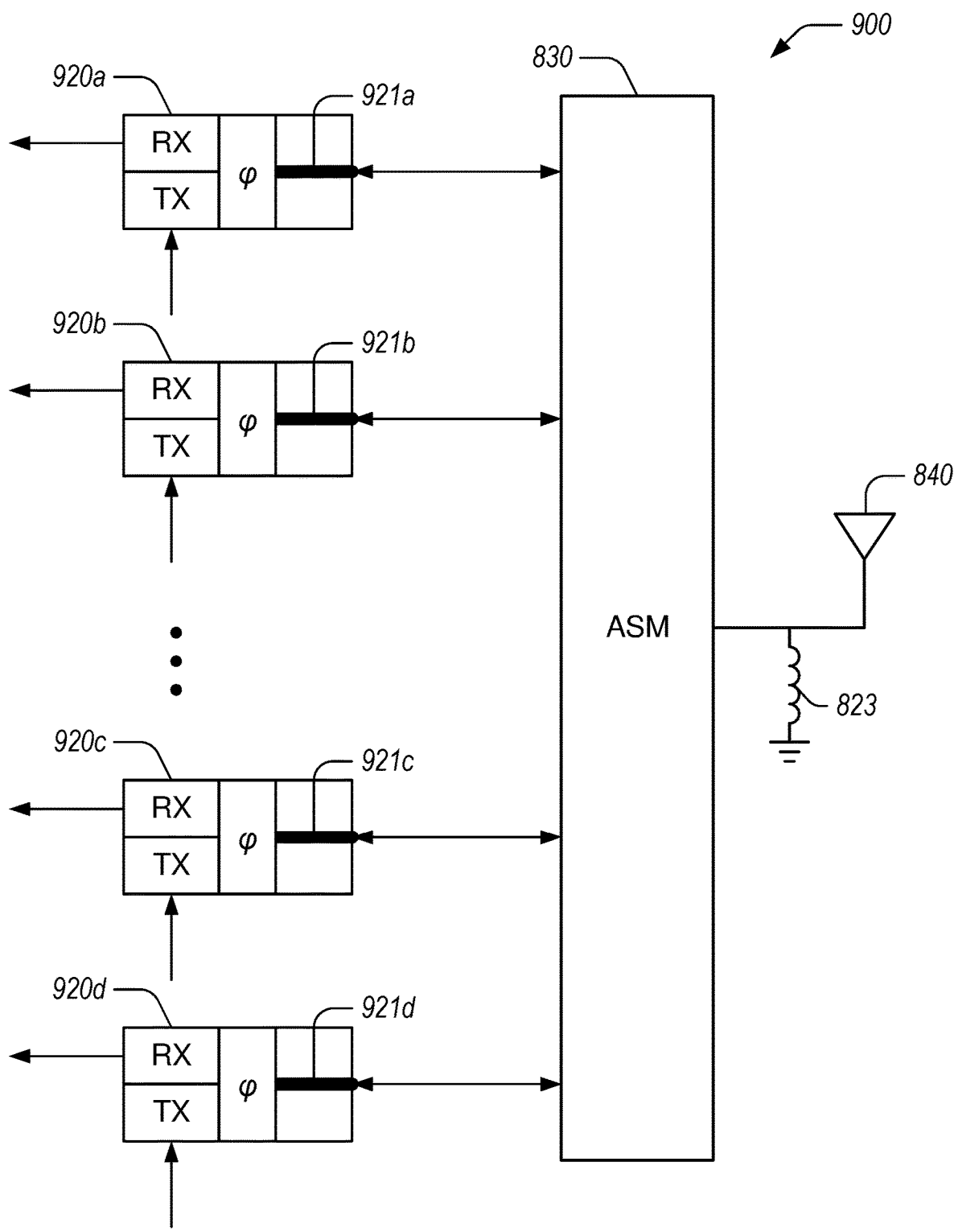
FIG. 9 illustrates an example front end architecture that includes duplexers that add a phase or impedance rotation element at the antenna node.

FIG. 9 illustrates an example front end architecture 900 that includes duplexers 920a-920d that add a phase or impedance rotation element at the antenna node. The phase or impedance rotation element is configured to provide a targeted impedance rotation so that the antenna shunt inductor 823 provides proper impedance matching across the plurality of frequency bands serviced by the plurality of duplexers 920a-920d. Thus, a single shunt inductor 823 can be used to provide targeted impedance matching for a plurality of frequency bands. In addition, an embedded trace 921a-921d can be implemented as part of the plurality of duplexers 920a-920d to assist with the targeted impedance rotation provided by the plurality of duplexers 920a-920d.

Figure 10:
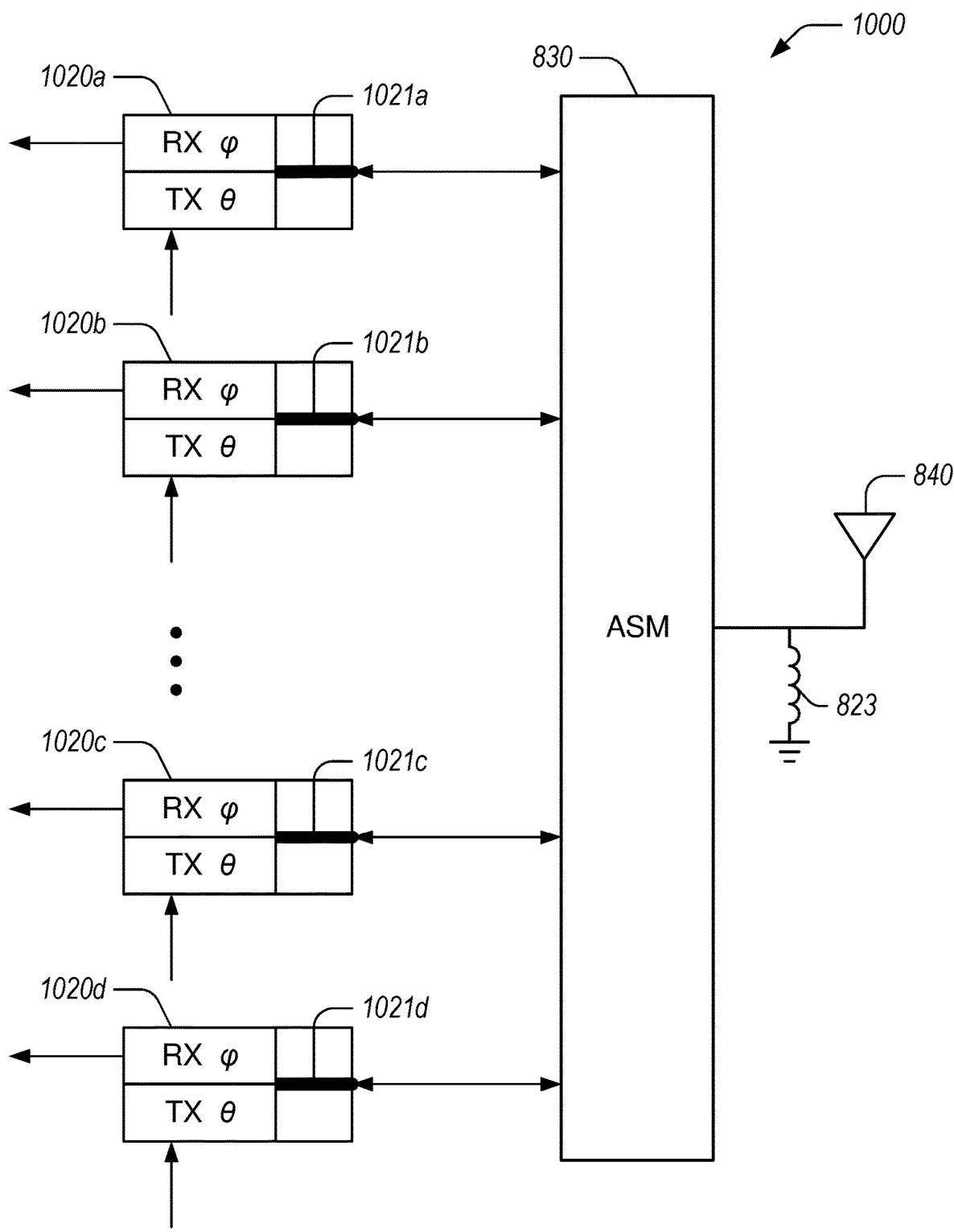
FIG. 10 illustrates an example front end architecture that includes duplexers that add a phase or impedance rotation element on the TX and RX filter sections.

FIG. 10 illustrates an example front end architecture 1000 that includes duplexers 1020a-1020d that add a phase or impedance rotation element on both the TX and RX filter sections. The phase or impedance rotation element is configured to provide a targeted impedance rotation so that the antenna shunt inductor 823 provides proper impedance matching across the plurality of frequency bands serviced by the plurality of duplexers 1020a-1020d. Thus, a single shunt inductor 823 can be used to provide targeted impedance matching for a plurality of frequency bands. In addition, an embedded trace 1021a-1021d can be implemented as part of the plurality of duplexers 1020a-1020d to assist with the targeted impedance rotation provided by the plurality of duplexers 1020a-1020d.

Figure 11:
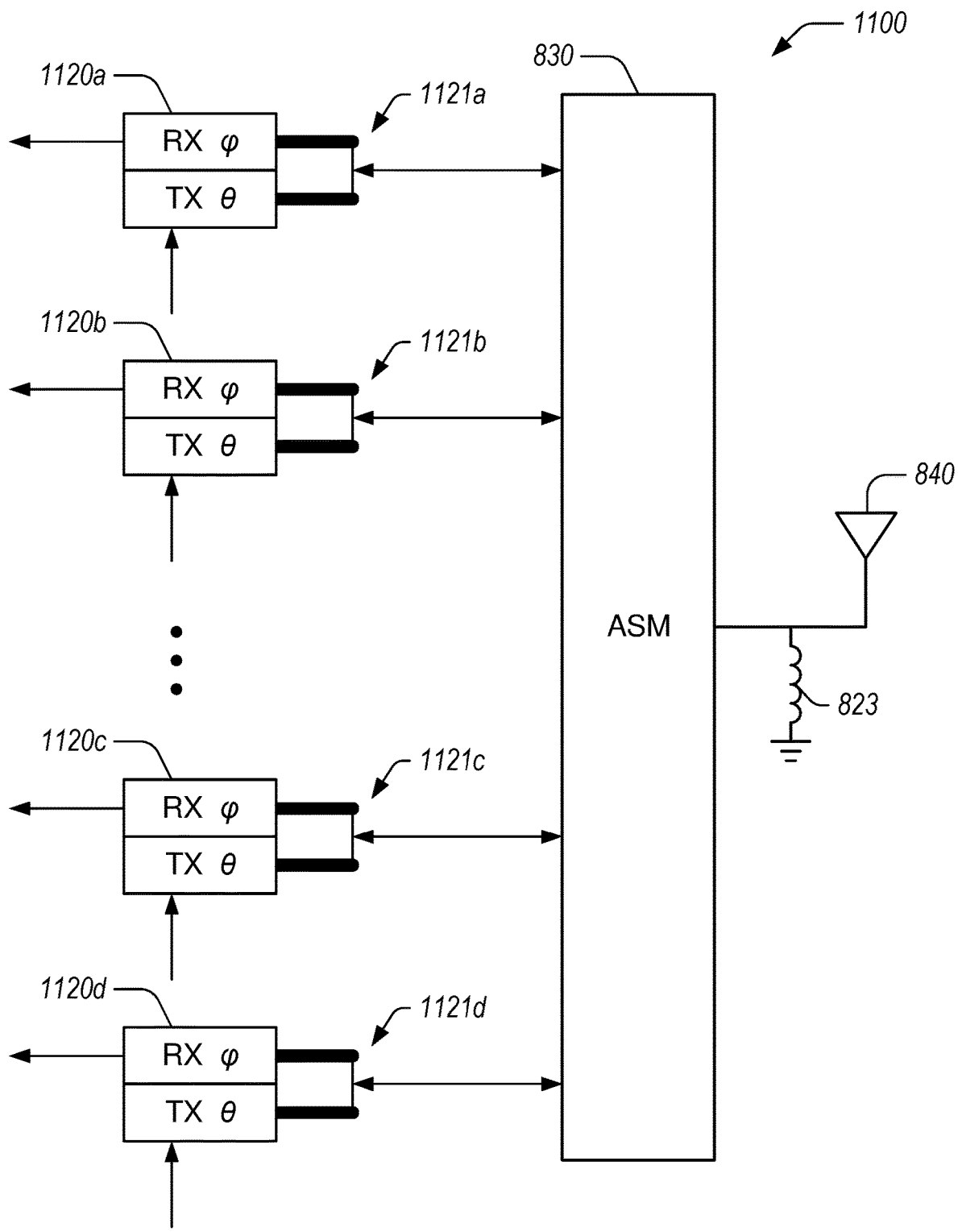
FIG. 11 illustrates an example front end architecture that includes duplexers that add a phase or impedance rotation element on each of the TX and RX filter sections.

FIG. 11 illustrates an example front end architecture 1100 that includes duplexers 1120a-1120d that are similar to the duplexers 1020a-1020d of the front end architecture 1000 in that the duplexers 1120a-1120d add a phase or impedance rotation element on both the TX and RX filter sections. The phase or impedance rotation element is configured to provide a targeted impedance rotation so that the antenna shunt inductor 823 provides proper impedance matching across the plurality of frequency bands serviced by the plurality of duplexers 1020*a*-1020*d*. Thus, a single shunt inductor 823 can be used to provide targeted impedance matching for a plurality of frequency bands. The duplexers 1120*a*-1120*d* include dedicated embedded traces 1121*a*-1121*d* for each TX and RX signal path to assist with the targeted impedance rotation provided by the plurality of duplexers 1020*a*-1020*d*. The dedicated traces 1121*a*-1121*d* merge to form the antenna node of the associated duplexer.

It is to be understood that the different duplexer configurations of FIGS. 10-11 can be combined in a single front end architecture. For example, impedance rotation elements at the antenna node can be implemented in some duplexers while other duplexers in the same front end module implement separate impedance rotation elements for the TX and RX filter sections. As another example, some duplexers may implement embedded traces for the TX and RX signal paths while other duplexers implement a single embedded trace to assist with impedance rotation.

In some embodiments, the front end architectures of FIGS. 8-11 can instead use two parallel high quality factor (Q) inductors in place of the single antenna shunt inductor. This advantageously may provide higher Q and may reduce SMT variation.

The disclosed front end architectures of FIGS. 8-11 provide a number of advantages by eliminating the need for a dedicated shunt inductor between individual duplexers and an antenna or antenna switch module. This reduces the cost of modules that incorporate these architectures. This also reduces the size of the modules that incorporate these architectures. This may also free up space on the modules that incorporate these architectures to enable inclusion of other elements to provide additional capabilities.

Single LNA Matching Inductor to Match all RX Frequency Bands

In some embodiments, front end architectures are configured to conglomerate receive contours to enable the use of a single low noise amplifier (LNA) matching inductor. The disclosed front end architectures are configured to conglomerate receive contours such that each of the frequency bands have an ending impedance on the receive signal path that lies within a target LNA noise circle after a matching inductor is applied. In some embodiments, a 0.6 dB noise circle is used as the target LNA noise circle but other sizes of noise circle may be used.

As used herein, receive contours can include the contours of receive signals plotted on a Smith chart. Thus, conglomerating receive contours can include tailoring one or more components in the receive signal path so that the contours of received signals, e.g., on a Smith chart, are grouped relatively tightly together. Tightly grouped receive contours are advantageous because they are easier for a single inductor to be used to provide impedance matching across a wide range of frequency bands.

Front end architectures typically include an antenna switch module that is coupled between an antenna and a plurality of duplexers. Each duplexer typically includes at least one series LNA-matching inductor on the receive signal path after the RX node of the duplexer. In certain instances, an extra capacitor may also be needed to provide suitable impedance matching so that each frequency band operates with a targeted noise factor (NF) or better. By way of example, in a 10-band frond end module, typically 10 inductors are required to operate 10 frequency bands. This approach not only increases the cost of the module, but it also makes it difficult to fit all these extra SMTs onto an already crowded module. Thus, the disclosed front end architectures eliminate the need for these dedicated SMTs and replace them with a single LNA matching inductor that achieves good electrical performance for all frequency bands. Advantageously, the disclosed front end architectures reduce costs and use less space.

Typically, front end architectures use at least one matching inductor for each frequency band to achieve targeted impedance matching to improve noise performance. In some instances, two matching components are required if the RX impedance rotation does not fall into the target noise circle of the LNA. If each frequency band uses the same matching inductor, the resulting RX impedances will not all fall within the target LNA noise circle. Some approaches align the RX impedance with the real impedance of the LNA. However, these approaches still use at least one matching inductor for each RX frequency band.

Accordingly, the disclosed front end architectures are configured to conglomerate duplexer RX contours into a specific or targeted region. This enables the use of a single matching inductor to operate all RX frequency bands. The disclosed front end architectures implement duplexers that place RX-ending impedances, after the LNA matching inductor, within a target LNA noise circle. The duplexers include RX filters designed to have an impedance that is tailored such that, along with the LNA matching inductor, each frequency band's ending RX impedance lies within the target LNA noise circle.

The disclosed architectures are advantageous because they reduce the number of SMTs required for radio-frequency (RF) modules, such as front end modules, low noise amplifier modules, and the like. The disclosed architectures are also advantageous because they improve performance of the modules across a wider range of frequency bands.

The disclosed architectures can be configured to place each frequency band's ending RX impedance within a target LNA noise circle by tailoring the RX filter of the plurality of duplexers. Impedance rotation is related to the equation $j\omega L$, indicating that lower frequency bands rotate less than higher frequency bands. Thus, the RX impedances for lower frequency bands need to be less capacitive while the RX impedances for higher frequency bands need to be more capacitive. The disclosed duplexers adjust the RX filter so that RX impedances for each frequency band lies within the target LNA noise circle after rotation caused by the single LNA matching inductor. In particular, one or more of the RX resonators is adjusted based on the frequency band that it is designed to filter. The target LNA noise circle can be one that enables superior operation of the LNAs. The disclosed architectures advantageously achieve similar or superior performance to architectures that use more components for impedance matching. Thus, the disclosed architectures achieve comparable performance with reduced cost and complexity. In addition, the disclosed architectures advantageously free up space on the module for other components or to allow the size of the module to be reduced. Decreasing the size of the module advantageously further reduces costs.

The disclosed architectures advantageously remove the need for matching networks and save on costs by removing SMTs that would otherwise be included for impedance matching. As a particular example, the disclosed architectures can enable the removal of about 10 SMTs from a module. Likewise, the disclosed architectures require less space due to the removal of unnecessary SMTs. The disclosed architectures can be applied to various LNA architectures such as a shared LNA for several frequency bands or a dedicated LNA for individual frequency bands.

Figure 12:
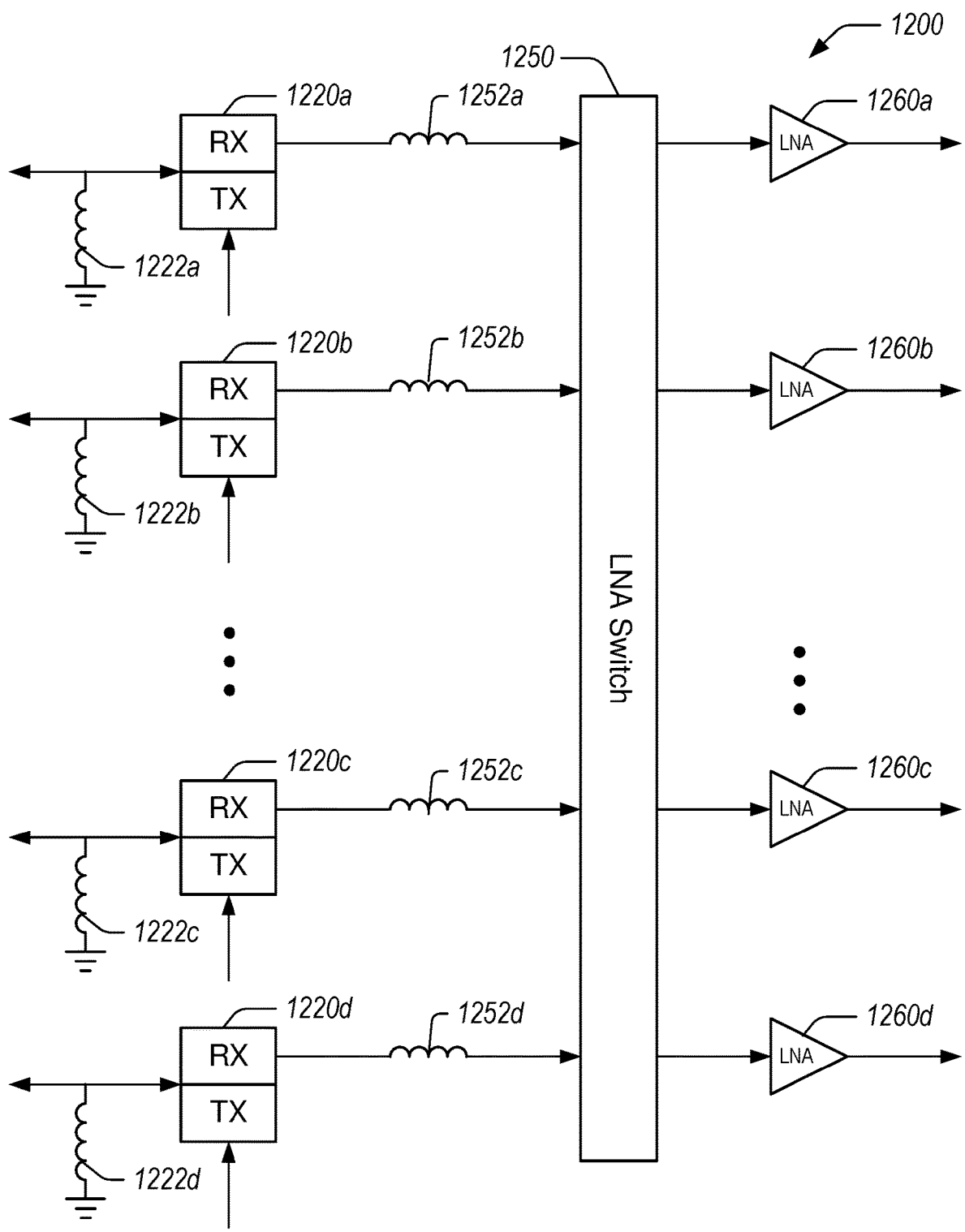
FIG. 12 illustrates a traditional approach to impedance matching in a front end architecture.

FIG. 12 illustrates a traditional approach to impedance matching in a front end architecture 1200. The front end architecture 1200 includes a LNA switch 1250 that couples a plurality of duplexers 1220a-1220d to LNAs 1260a-1260d. The front end architecture includes shunt inductors 1222a-1222d similar to the shunt inductors 122a-122d of FIG. 1. The front end architecture 1200 also includes series inductors 1252a-1252d configured to provide impedance matching for the plurality of duplexers 1220a-1220d and LNAs 1260a-1260d. The series inductors 1252a-1252d are configured to rotate the receive signals from the receive filter of the duplexers 1220a-1220d to a targeted LNA noise circle. Each inductor 1252a-1252d may have a different value to provide sufficient rotation to the targeted LNA noise circle and may depend on the frequency band of the signals passing through the respective receive filters of the duplexers 1220a-1220d.

Figure 13:
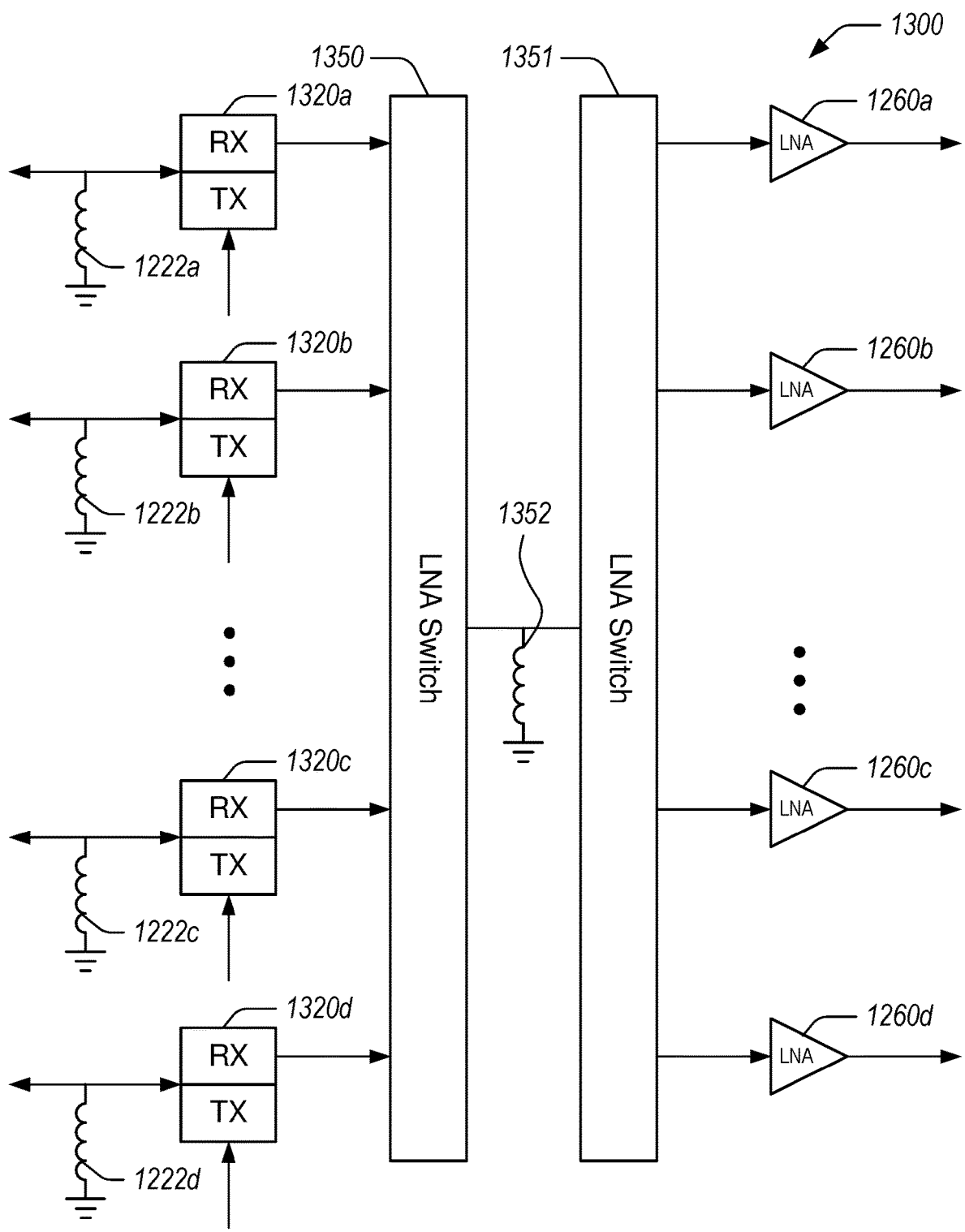
FIG. 13 illustrates an example embodiment of a front end architecture that enables removal of the dedicated RX signal path impedance matching inductors of FIG. 12 and replaces them with a single LNA matching inductor.

In comparison, FIG. 13 illustrates an example embodiment of a front end architecture 1300 that enables removal of the dedicated RX signal path impedance matching inductors of FIG. 12 and replaces them with a single LNA matching inductor 1352. The front end architecture 1300 adds a second LNA switch 1351 to the first LNA switch 1350 (which is similar to the LNA switch 1250 of FIG. 12). A single LNA matching inductor 1352 is coupled between the first LNA switch 1350 and the second LNA switch 1351. The plurality of duplexers 1320a-1320d is tailored in such a way that the single LNA matching inductor 1352 provides a desired or targeted rotation to the receive signals from the first LNA switch 1350 so that, after the single LNA matching inductor 1352, the receive signals are within a target LNA noise circle. As a result, there are no matching inductors between the RX node of the plurality of duplexers 1320a-1320d and the first LNA switch 1350. In addition, there are no matching inductors between the second LNA switch 1351 and the plurality of LNAs 1260a-1260d. In other words, the single LNA matching inductor 1352 is configured to rotate the conglomerated receive signal contours into a target LNA noise circle without additional impedance matching components between the plurality of duplexers 1320a-1320d and the first LNA switch 1350 and/or without additional impedance matching components between the second LNA switch 1351 and the plurality of LNAs 1260a-1260d. Effectively, the combination of the tailored duplexers 1320a-1320d and the single LNA matching inductor 1352 replaces the plurality of series matching inductors 1252a-1252d in FIG. 12. This results in a reduction of components needed for the front end architecture 1300 relative to the front end architecture 1200 of FIG. 12.

Figure 14A:
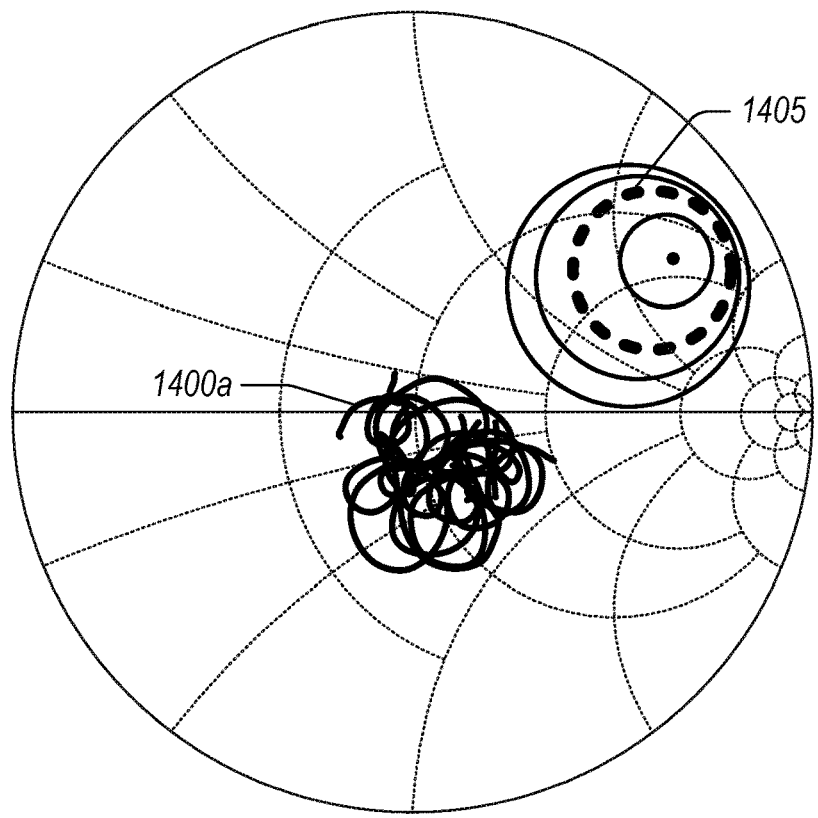
FIG. 14A illustrates RX contours for a typical front end architecture.
Figure 14A:
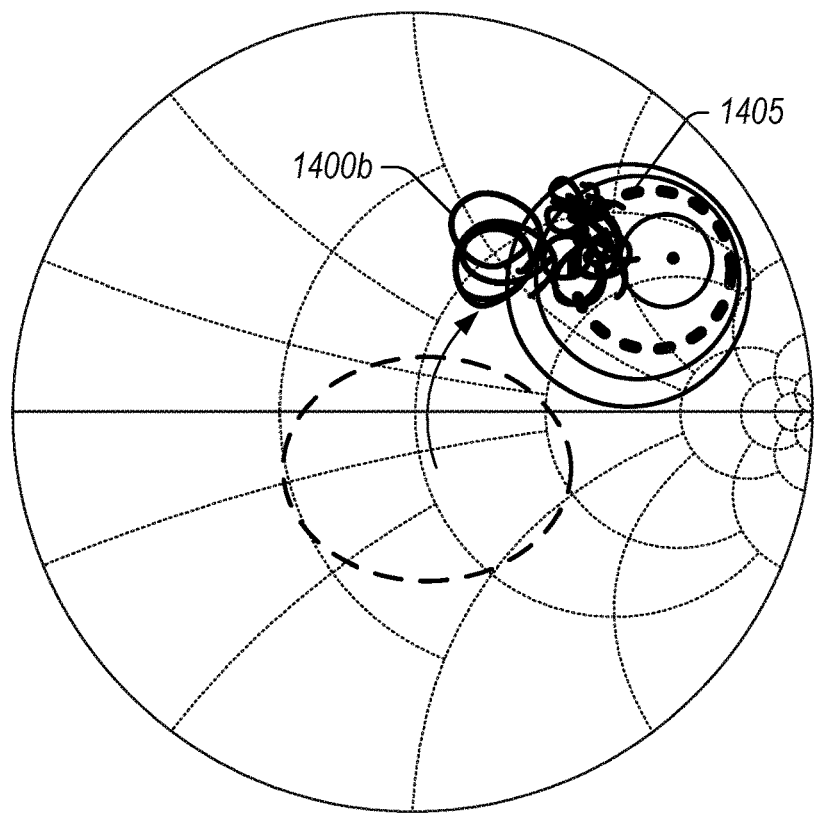

FIG. 14A illustrates RX contours for a typical front end architecture (e.g., the front end architecture 1200 of FIG. 12). The RX contours are scattered and are difficult to impedance match for the low noise amplifiers. Thus, some frequency bands may be impedance matched while others are not. If a single matching inductor were used, the rotation of the group of RX contours 1400a to the group of RX contours 1400b would result. The resulting RX contours 1400b would lie outside the target LNA noise circle 1405. It is necessary, then, to add a tailored impedance to get the various RX contours to be rotated to lie within the target noise circle. As a result, it is necessary to add impedance matching components in the receive signal path, such as the impedance matching networks 1252a-1252d. The target noise circle is illustrated as 0.6 dB, but other sizes of noise circles may be used as well.

Figure 14B:
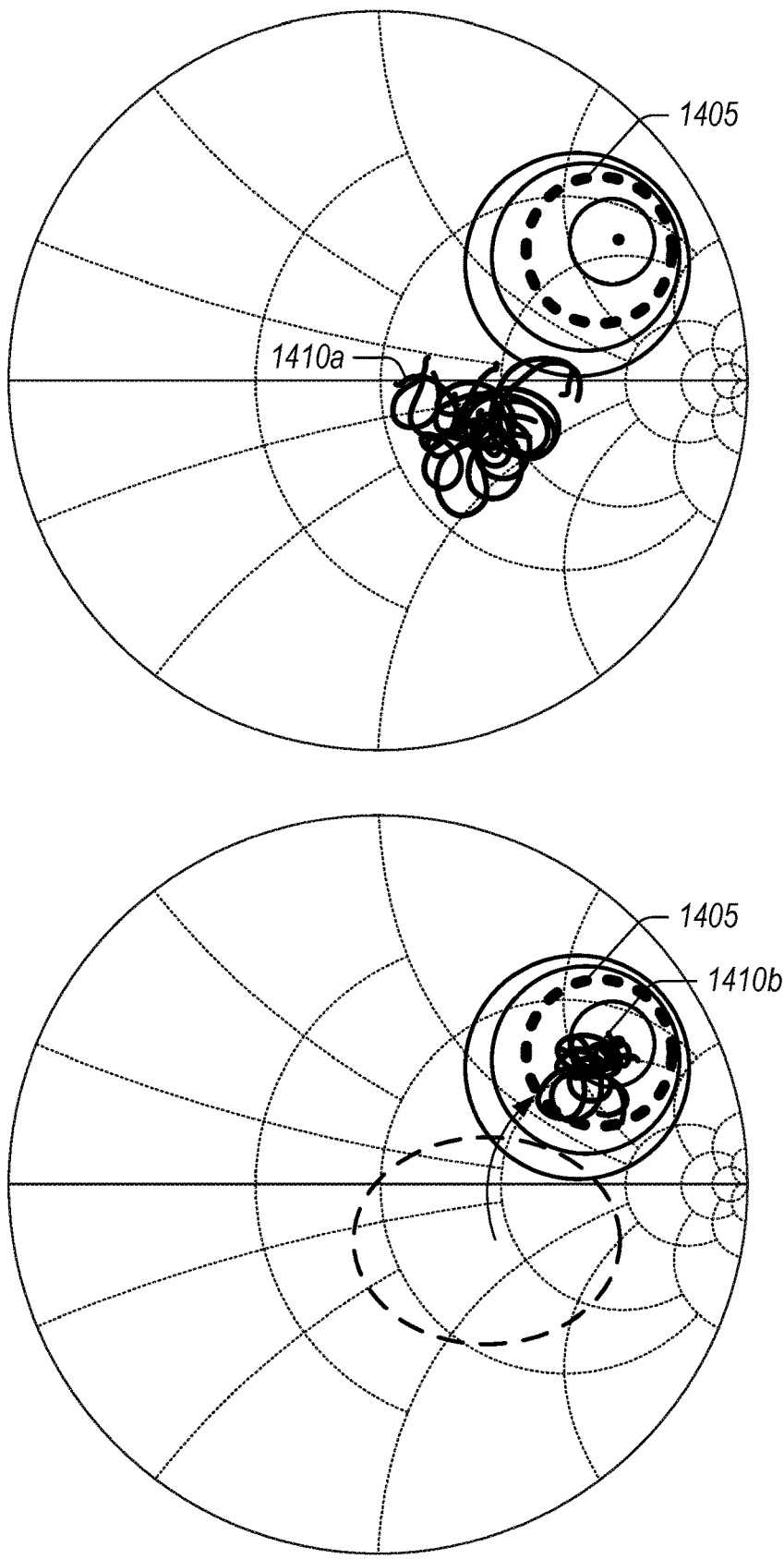
FIG. 14B illustrates RX contours for the front end architectures disclosed herein.

In contrast, FIG. 14B illustrates RX contours for the front end architectures disclosed herein (e.g., the front end architecture 1300 of FIG. 3). The RX contours are conglomerated as shown in 1410a providing a better impedance for the LNA to match. Rotation of the conglomerated RX contours by a single LNA matching inductor (e.g., the single LNA matching inductor 1352) is illustrated as the group RX contours 1410b, which lie inside the target noise circle. The RX contours are conglomerated due at least in part to the duplexers being tailored to achieve this targeted behavior. In particular, one or more resonators of the RX filter of an individual duplexer is tailored based on the frequency band to be filtered by the duplexer such that the resulting RX contour is capable of being rotated to the target LNA noise circle by a single LNA matching inductor. Said another way, all of the frequency bands see RX impedances that are at a specific targeted region such that a single inductor is sufficient to rotate the impedances of all of the frequency bands inside the target noise circle.

Figure 15A:
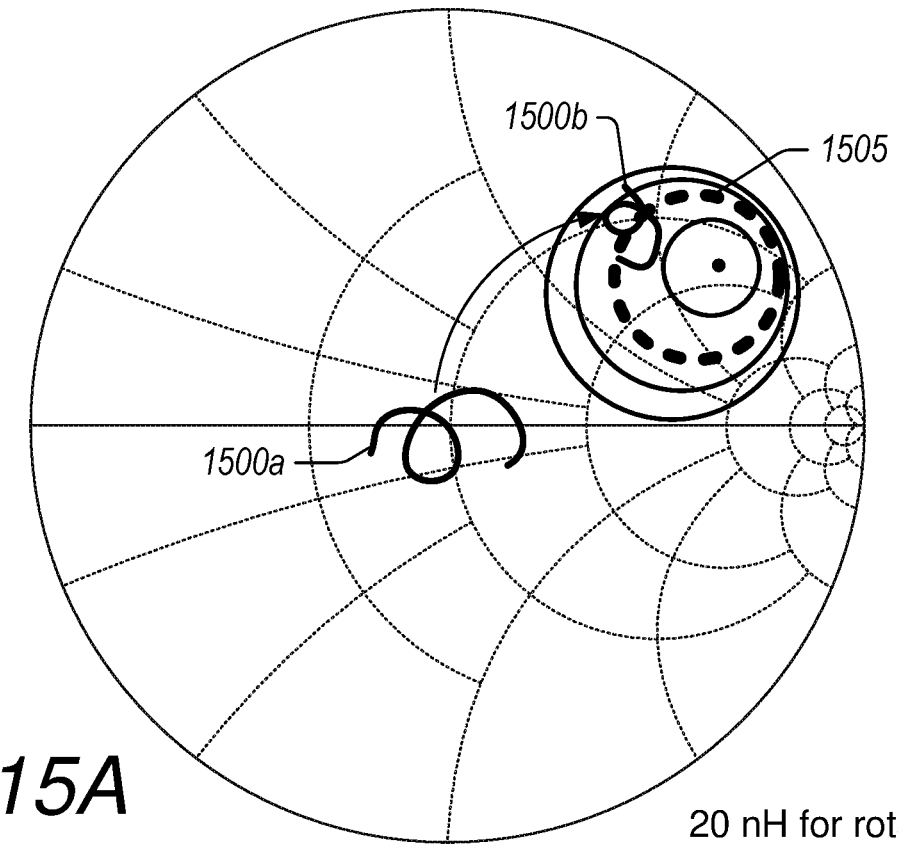
FIG. 15A illustrates impedance rotation of the frequency band B12 RX using a 20 nH inductor.
Figure 15B:
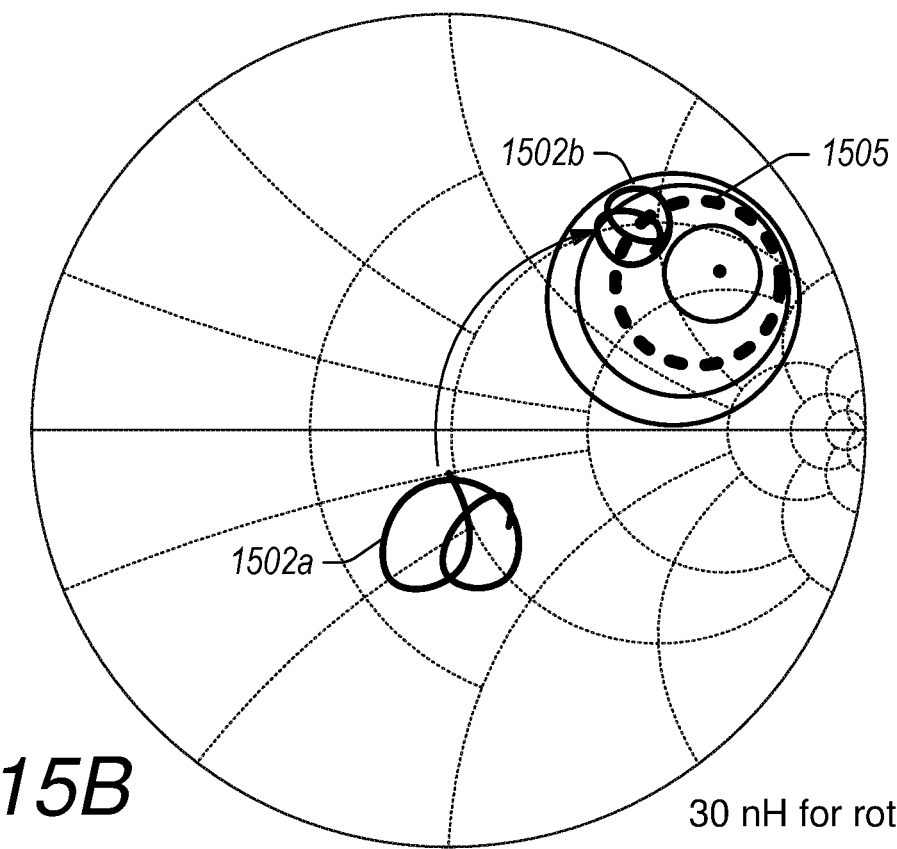
FIG. 15B illustrates impedance rotation of the frequency band B71A RX using a 30 nH inductor.

To further illustrate the point, FIG. 15A illustrates impedance rotation of the frequency band B12 RX using a 20 nH inductor and FIG. 15B illustrates impedance rotation of the frequency band B71A RX using a 30 nH inductor (the lower frequency signal B71A RX needs a higher inductance to achieve a targeted rotation). The B12 RX contour 1500a is rotated to lie near the target LNA noise circle 1505 as shown by the rotated contour 1500b. Similarly, the B71A RX contour 1502a is rotated to lie near the target LNA noise circle 1505 as shown by the rotated contour 1502b. Since each duplexer operates on a different frequency band, the inductance needed to rotate the RX impedance inside the target LNA noise circle is different.

Figure 15C:
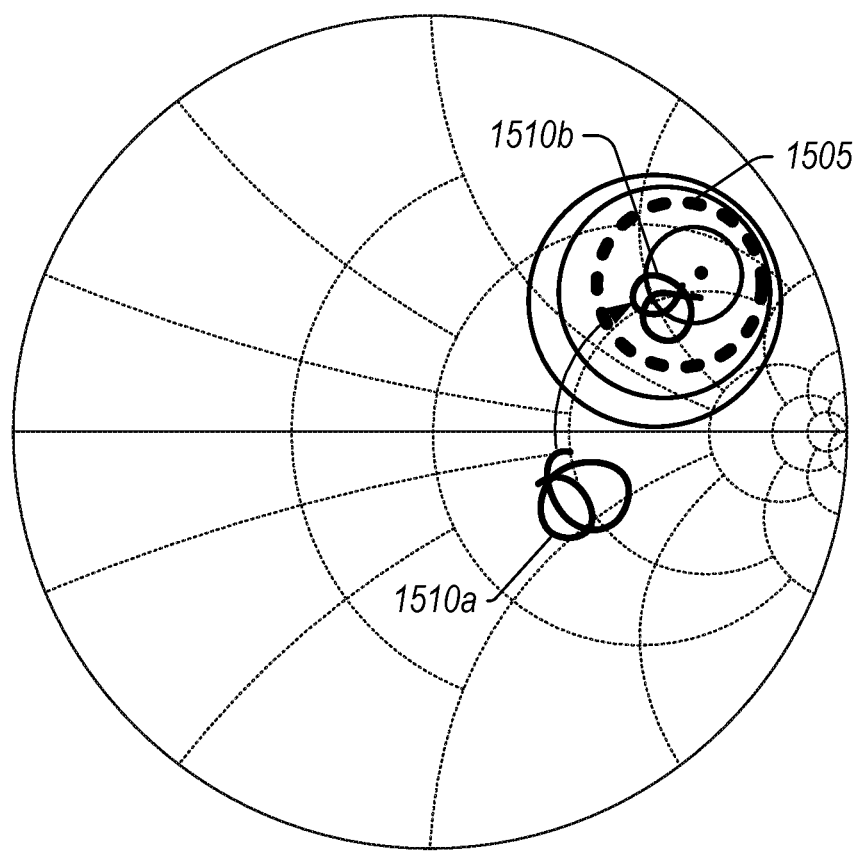
FIG. 15C illustrates an RX contour that is rotated to be an RX contour that lies within the target noise circle.

However, the goal of the disclosed front end architectures is to have the ending RX impedance of each frequency band to lie within the target LNA noise circle after a matching inductor is applied. This is illustrated in FIG. 15C where the RX contour 1510a is rotated to be RX contour 1510b that lies within the target noise circle. The RX contour 1510a is the starting impedance without a matching inductor. The rotated RX contour 1510b is the ending impedance after the matching inductor. The rotation is achieved using a fixed inductor value. The illustrated RX contour is for the frequency band B20 RX.

To achieve the goal illustrated in FIG. 15C, the RX filters for each frequency band or range of frequencies is tailored to have a RX impedance such that a fixed inductor value after the RX filter results in each frequency band's ending impedance to lie within the target LNA noise circle.

Returning to FIG. 6, the example duplexer 620 can be configured to enable the disclosed front end architectures to remove matching inductors between the LNA switch and the duplexers. The duplexer 620 adjusts characteristics of the RX resonators 624a to 624n between the antenna (ANT) and the RX ports. In some embodiments, the last RX resonator 624n is adjusted to achieve a desired impedance location for the RX contours. In some embodiments, the duplexer 620 comprises SAW resonators and/or acoustic filters.

Accordingly, the disclosed front end architectures include duplexers that have resonators that have been configured to provide a targeted impedance such that a single matching inductor after the RX filter of the duplexer results in a targeted ending RX impedance presented to the LNAs. Each duplexer is thus tuned for an individual frequency band or a particular frequency range. Thus, the duplexers of the disclosed front end architectures have custom-tuned impedances.

Combining Impedance Matching Architectures

In some embodiments, front end architectures can combine the techniques disclosed herein. For example, techniques to remove impedance matching networks on a transmission signal path (e.g., the front end architecture 200) can be combined with techniques to remove matching inductors on a receive signal path (e.g., the front end architecture 1300) which can also be combined with techniques to remove shunt antenna inductors for individual signal paths (e.g., the front end architecture 800). The resulting combination may replace the functionality of the various impedance matching components with two inductors that provide targeted impedance matching across a range of frequency bands or frequency ranges for both transmit and receive functions.

In a multi-band front end module, in order for each frequency band's TX and RX functions to operate properly and efficiently, matching components are needed at the duplexer's antenna, TX, and RX nodes. By way of example, in a 10-band LB module, the total number of matching components can be as high as 30 to 35 SMTs. The disclosed front end architectures, combining the techniques disclosed herein, provides for equivalent functionality using only two matching inductors to operate TX and RX functions for all of the frequency bands. This represents a large savings on building costs and reduces the required space on modules, allowing the modules to shrink in size and/or for more components to be included on the module to improve performance and/or to provide additional capabilities.

As described herein, typical front end architectures utilize at least one matching inductor at each duplexer's antenna and RX nodes. For some frequency bands, typical front end architectures also utilize at least one matching network at the TX node of the duplexer and an additional impedance matching component at the RX node. By combining the methodologies and techniques disclosed herein, the disclosed front end architectures can reduce the total number of components needed for all duplexers but can also shrink the overall size of the resulting module.

Figure 16:
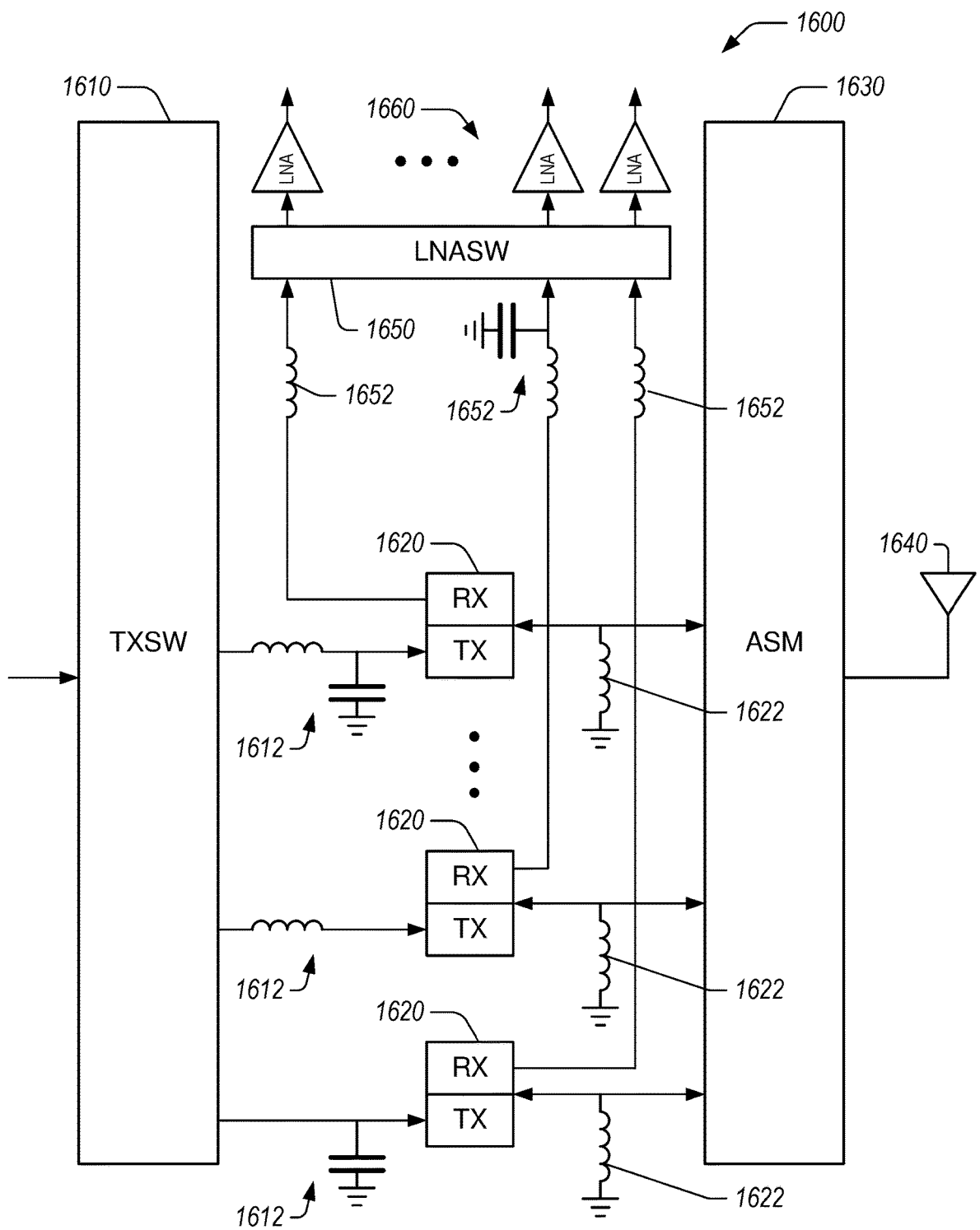
FIG. 16 illustrates a traditional front end architecture that includes a TX switch, a plurality of duplexers, an ASM, an antenna, a LNA switch, and a plurality of LNAs.

FIG. 16 illustrates a traditional front end architecture 1600 that includes a TX switch 1610, a plurality of duplexers 1620, an ASM 1630, an antenna 1640, a LNA switch 1650, and a plurality of LNAs 1660. The front end architecture 1600 includes TX matching networks 1612 between the TX switch 1610 and the TX node of the duplexers 1620. The front end architecture 1600 includes antenna shunt inductors 1622 between the antenna node of the duplexers 1620 and the ASM 1630. The front end architecture includes RX matching networks 1652 between the RX node of the duplexers 1620 and the LNA switch 1650.

Figure 17:
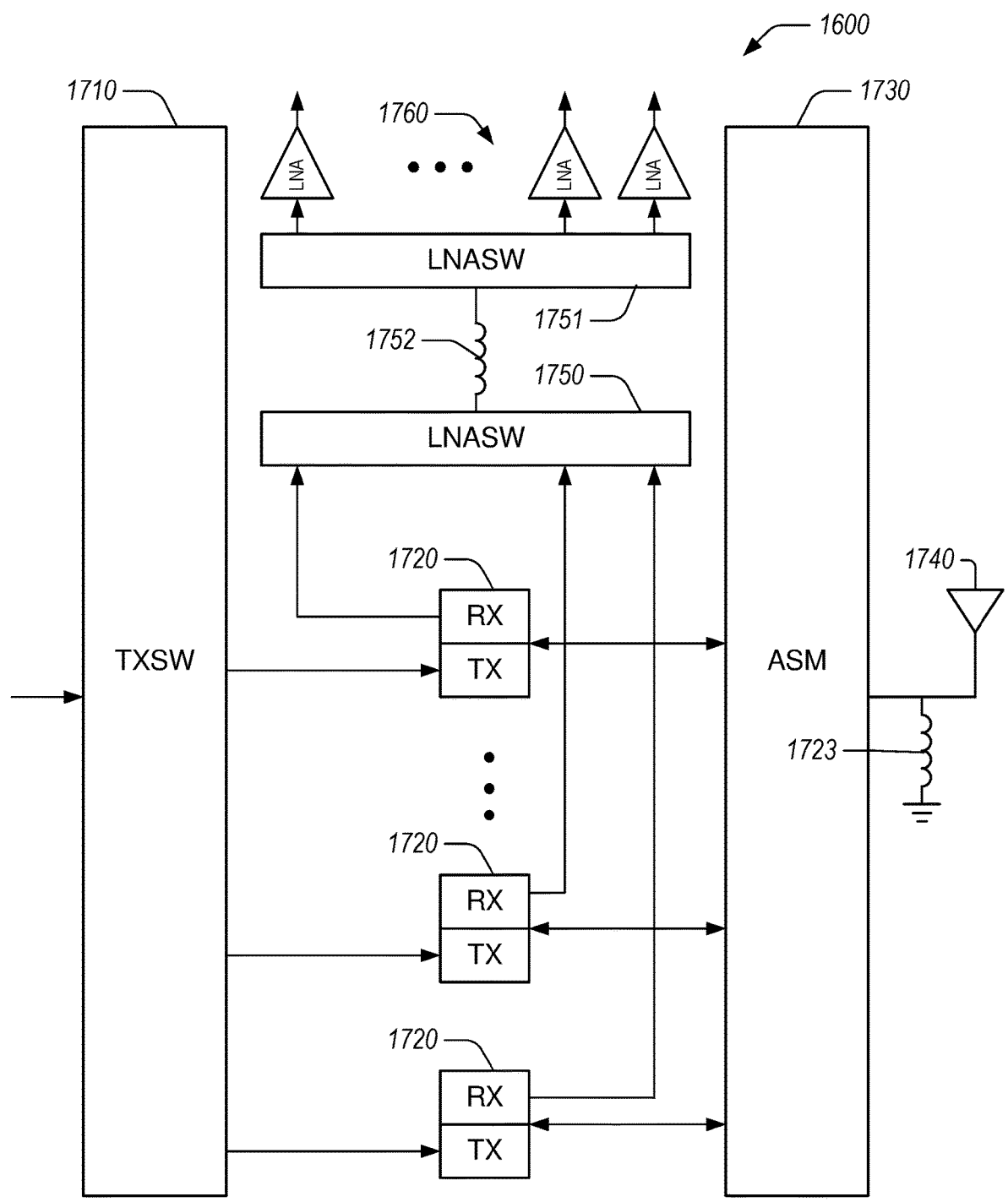
FIG. 17 illustrates an example front end architecture that combines the methodologies disclosed herein.

FIG. 17 illustrates an example front end architecture 1700 that combines the methodologies disclosed herein. The front end architecture 1700 includes a TX switch 1710, a plurality of duplexers 1720, an ASM 1730, an antenna 1740, a pair of LNA switches 1750, 1751, and a plurality of LNAs 1760. By tailoring the duplexers 1720 (e.g., tuning the first TX resonator of the duplexers, tuning the last RX resonator of the duplexers, tuning the resonators that tie to the antenna node of the duplexers, implementing impedance rotation elements, tuning embedded traces, etc.), many of the impedance matching components of the front end architecture 1600 can be removed. As a result, the front end architecture 1700 only includes two impedance matching components: the single LNA matching inductor 1752 coupled between the two LNA switches 1750, 1751, and the single antenna matching inductor 1723 coupled between the ASM 1730 and the antenna 1740. This results in far fewer elements in the front end architecture 1700, saving cost and space. The front end architecture 1700 may be implemented for a variety of PA architectures, including but not limited to, class E, class AB, or pull-pull. Similarly, the front end architecture 1700 may be implemented for a variety of LNA architectures, including but not limited to, a shared LNA for multiple frequency bands or ranges or dedicated LNAs for individual frequency bands or ranges.

Examples of Products and Architectures

Figure 18:
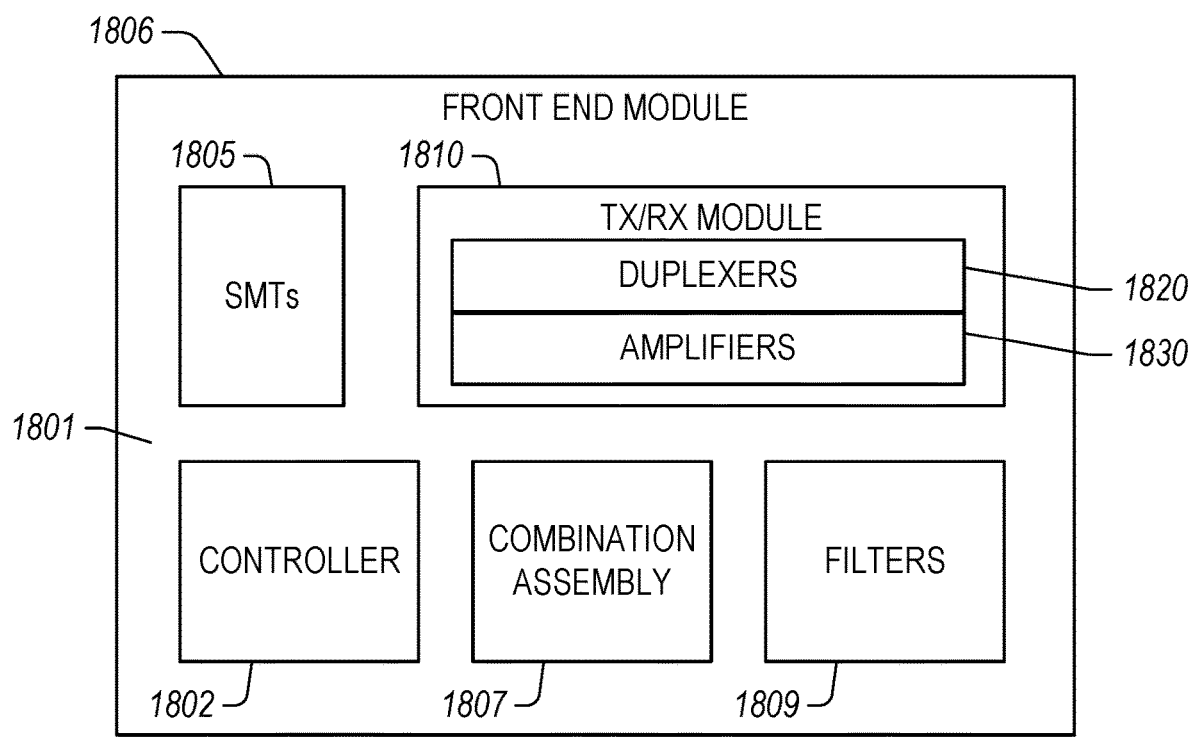
FIG. 18 illustrates that in some embodiments, some or all of the front end architectures or configurations, including some or all of the configurations having the combinations of features described herein, can be implemented, wholly or partially, in a module.

FIG. 18 illustrates that in some embodiments, some or all of the front end architectures or configurations, including some or all of the configurations having the combinations of features described herein (e.g., FIGS. 2, 5, 6, 8-11, 13, and 17), can be implemented, wholly or partially, in a module. Such a module can be, for example, a front-end module (FEM). Such a module can be, for example, a multi-input, multi-output (MiMo) module.

In the example of FIG. 18, a module 1806 can include a packaging substrate 1801, and a number of components can be mounted on such a packaging substrate 1801. For example, a controller 1802 (which may include a front-end power management integrated circuit [FE-PIMC]), a combination assembly 1807, a TX/RX assembly 1810 that includes duplexers 1820 and amplifiers 1830 having one or more features as described herein, and a filter bank 1809 (which may include one or more bandpass filters) can be mounted and/or implemented on and/or within the packaging substrate 1801. Other components, such as a number of SMT devices 1805, can also be mounted on the packaging substrate 1801. Although all of the various components are depicted as being laid out on the packaging substrate 1801, it will be understood that some component(s) can be implemented over other component(s).

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart phone, a hand-held wireless device with or without phone functionality, a wireless tablet, etc.

Figure 19:
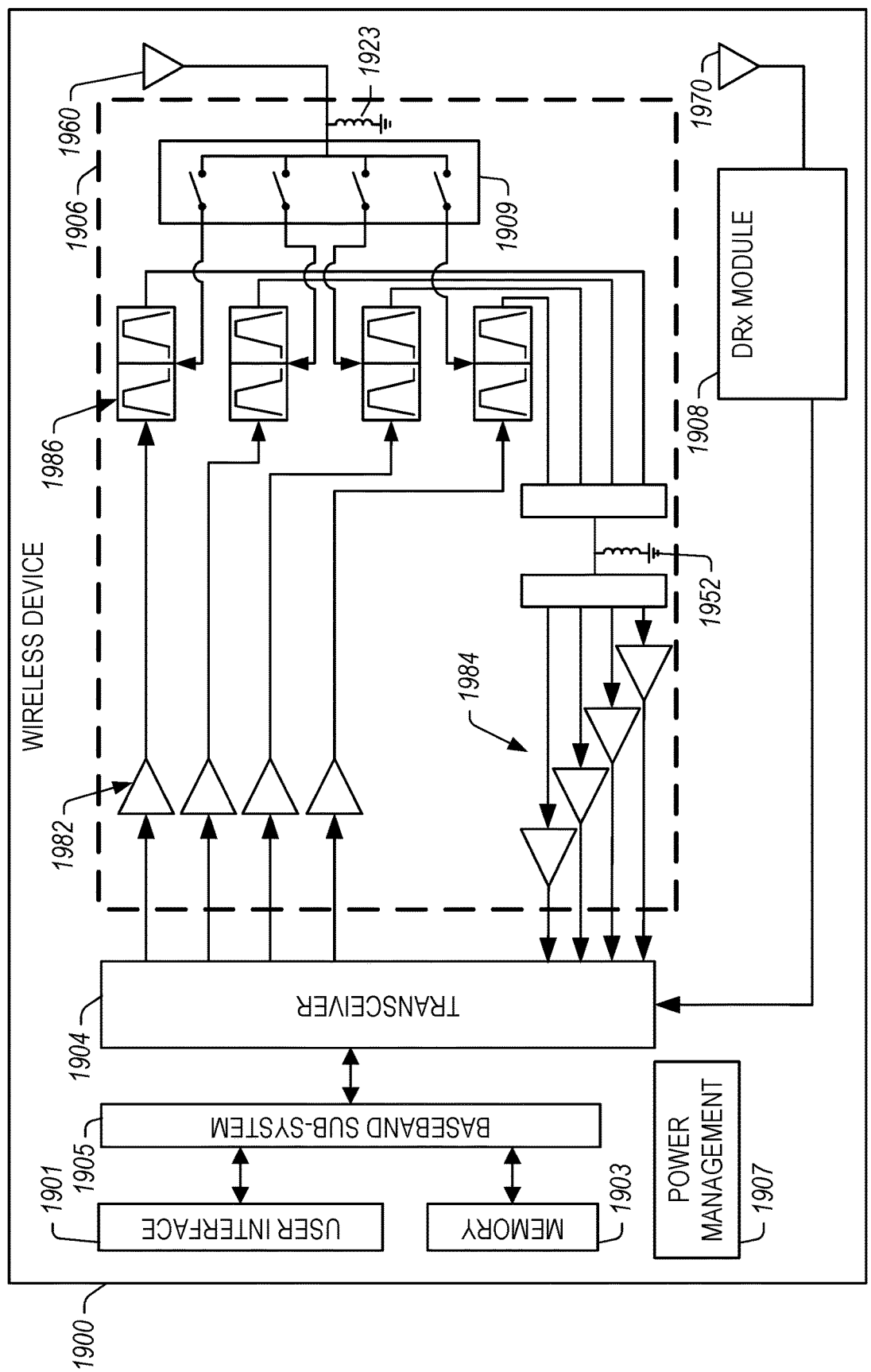
FIG. 19 depicts an example wireless device having one or more advantageous features described herein.

FIG. 19 depicts an example wireless device 1900 having one or more advantageous features described herein. In the context of one or more modules having one or more features as described herein, such modules can be generally depicted by a dashed box 1906 (which can be implemented as, for example, a front-end module) and a diversity receiver (DRX) module 1908 (which can be implemented as, for example, a front-end module).

Referring to FIG. 19, power amplifiers (PAs) 1982 can receive their respective RF signals from a transceiver 1904 that can be configured and operated to generate RF signals to be amplified and transmitted, and to process received signals. The transceiver 1904 is shown to interact with a baseband sub-system 1905 that is configured to provide conversion between data and/or voice signals suitable for a user and RF signals suitable for the transceiver 1904. The transceiver 1904 can also be in communication with a power management component 1907 that is configured to manage power for the operation of the wireless device 1900. Such power management can also control operations of the baseband sub-system 1905 and the modules 1906 and 1908.

The baseband sub-system 1905 is shown to be connected to a user interface 1901 to facilitate various input and output of voice and/or data provided to and received from the user. The baseband sub-system 1905 can also be connected to a memory 1903 that is configured to store data and/or instructions to facilitate the operation of the wireless device, and/or to provide storage of information for the user.

In the example wireless device 1900, outputs of the PAs 1982 are shown to be routed to their respective duplexers 1986. The duplexers 1986 can be configured as described herein to conglomerate TX contours to remove matching components between the PAs 1982 and the duplexers 1986. Such amplified and filtered signals can be routed to a primary antenna 1960 through a switching network 1909 for transmission. In some embodiments, the duplexers 1986 can allow transmit and receive operations to be performed simultaneously using a common antenna (e.g., primary antenna 1960).

In FIG. 19, received signals are routed to low-noise amplifiers 1984. LNA switches can be used, in conjunction with tailoring the duplexers 1986 to conglomerate RX contours as described herein, to replace matching networks between the duplexers and the LNAs with a single LNA matching inductor 1952 between two LNA switches. In addition, the duplexers 1986 can be configured as described herein to replace antenna matching inductors with a single antenna matching inductor 1923 between the antenna 1960 and the antenna switch module 1909.

The wireless device also includes a diversity antenna 1970 and a diversity receiver module 1908 that receives signals from the diversity antenna 1070. The diversity receiver module 1908 processes the received signals and transmits the processed signals to the transceiver 1904. In some embodiments, a diplexer, triplexer, or other multiplexer or filter assembly can be included between the diversity antenna 1970 and the diversity receiver module 1970, as described herein. The diversity module 1908 may implement one or more of the methodologies described herein.

One or more features of the present disclosure can be implemented with various cellular frequency bands as described herein. Examples of such bands are listed in Table 1. It will be understood that at least some of the bands can be divided into sub-bands. It will also be understood that one or more features of the present disclosure can be implemented with frequency ranges that do not have designations such as the examples of Table 1. It is to be understood that the term radio frequency (RF) and radio frequency signals refers to signals that include at least the frequencies listed in Table 1.

TABLE 1

| Band | Mode | TX Frequency Range (MHz) | RX Frequency Range (MHz) |
| --- | --- | --- | --- |
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B32 | FDD | N/A | 1,452-1,496 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |
| B45 | TDD | 1,447-1,467 | 1,447-1,467 |
| B46 | TDD | 5,150-5,925 | 5,150-5,925 |
| B65 | FDD | 1,920-2,010 | 2,110-2,200 |
| B66 | FDD | 1,710-1,780 | 2,110-2,200 |
| B67 | FDD | N/A | 738-758 |
| B68 | FDD | 698-728 | 753-783 |
| B71 | FDD | 663-698 | 617-652 |

Additional Embodiments and Terminology

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits.

Alternatively or additionally, such a feature or function can be implemented completely or partially using specialized computers designed to perform the particular functions described herein rather than by general purpose computers.

Multiple distributed computing devices can be substituted for any individual computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general-purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A front end architecture comprising:
   a plurality of duplexers, each duplexer of the plurality of duplexers comprising a phase or impedance rotation element and configured to filter signals within a particular frequency range;
   an antenna switch module coupled to the plurality of duplexers and configured to direct signals between an antenna and the plurality of duplexers;
   a single shunt inductor between the antenna switch module and the antenna, the single shunt inductor configured to provide impedance matching to the plurality of duplexers without use of additional shunt inductors between the plurality of duplexers and the antenna switch module;
   a first low noise amplifier (LNA) switch coupled to the plurality of duplexers;
   an LNA inductor coupled to the first LNA switch; and a second LNA switch coupled to a plurality of low noise amplifiers and coupled to the LNA inductor such that the LNA inductor is coupled in series between the first LNA switch and the second LNA switch to provide impedance matching to receive signals passed from the plurality of duplexers to the first LNA switch.

2. The front end architecture of claim 1 wherein each duplexer of the plurality of duplexers includes the phase or impedance rotation element at an antenna node of each duplexer of the plurality of duplexers.

3. The front end architecture of claim 2 wherein each duplexer of the plurality of duplexers further includes an embedded trace to further provide impedance matching to enable the impedance matching using the single shunt inductor.

4. The front end architecture of claim 1 wherein each duplexer of the plurality of duplexers includes the phase or impedance rotation element on each of a RX filter and a TX filter of each duplexer of the plurality of duplexers.

5. The front end architecture of claim 4 wherein each duplexer of the plurality of duplexers further includes an embedded trace to further provide impedance matching to the enable impedance matching using the single shunt inductor.

6. The front end architecture of claim 5 wherein each duplexer of the plurality of duplexers further includes a RX embedded trace as part of a RX filter path of the RX filter and a TX embedded trace as part of a TX filter path of the TX filter.

7. The front end architecture of claim 1 wherein there are no shunt inductors between any of the plurality of duplexers and the antenna switch module.

8. A radio-frequency (RF) front end module comprising:
a packaging substrate;
a plurality of duplexers implemented on the packaging substrate, each duplexer of the plurality of duplexers comprising a phase or impedance rotation element and configured to filter signals within a particular frequency range;
an antenna switch module implemented on the packaging substrate, the antenna switch module coupled to the plurality of duplexers and configured to direct signals between an antenna and the plurality of duplexers;
a single shunt inductor implemented on the packaging substrate, the single shunt inductor coupled between the antenna switch module and the antenna, the single shunt inductor configured to provide impedance matching to the plurality of duplexers without use of additional shunt inductors between the plurality of duplexers and the antenna switch module;
a first low noise amplifier (LNA) switch coupled to the plurality of duplexers;
an LNA inductor coupled to the first LNA switch; and
a second LNA switch coupled to a plurality of low noise amplifiers and coupled to the LNA inductor such that the LNA inductor is coupled in series between the first LNA switch and the second LNA switch to provide impedance matching to receive signals passed from the plurality of duplexers to the first LNA switch.

9. The RF front end module of claim 8 wherein each duplexer of the plurality of duplexers includes the phase or impedance rotation element at an antenna node of each duplexer of the plurality of duplexers.

10. The RF front end module of claim 9 wherein each duplexer of the plurality of duplexers further includes an embedded trace to further provide impedance matching to enable the impedance matching using the single shunt inductor.

11. The RF front end module of claim 8 wherein each duplexer of the plurality of duplexers includes the phase or impedance rotation element on each of a RX filter and a TX filter of each duplexer of the plurality of duplexers.

12. The RF front end module of claim 11 wherein each duplexer of the plurality of duplexers further includes an embedded trace to further provide impedance matching to enable the impedance matching using the single shunt inductor.

13. The RF front end module of claim 12 wherein each duplexer of the plurality of duplexers further includes a RX embedded trace as part of a RX filter path of the RX filter and a TX embedded trace as part of a TX filter path of the TX filter.

14. The RF front end module of claim 8 wherein there are no shunt inductors between any of the plurality of duplexers and the antenna switch module.

15. A wireless device comprising:
a primary antenna;
a plurality of duplexers, each duplexer of the plurality of duplexers comprising a phase or impedance rotation element and configured to filter signals within a particular frequency range;
an antenna switch module coupled to the plurality of duplexers and configured to direct radio frequency signals between the primary antenna and the plurality of duplexers;
a single shunt inductor between the antenna switch module and the primary antenna, the single shunt inductor configured to provide impedance matching to the plurality of duplexers without use of additional shunt inductors between the plurality of duplexers and the antenna switch module;
a first low noise amplifier (LNA) switch coupled to the plurality of duplexers;
an LNA inductor coupled to the first LNA switch;
a second LNA switch coupled to a plurality of low noise amplifiers and coupled to the LNA inductor such that the LNA inductor is coupled in series between the first LNA switch and the second LNA switch to provide impedance matching to receive signals passed from the plurality of duplexers to the first LNA switch; and
a controller implemented to control the antenna switch module to direct the radio frequency signals between the plurality of duplexers and the primary antenna.

16. The wireless device of claim 15 wherein each duplexer of the plurality of duplexers includes the phase or impedance rotation element at an antenna node of each duplexer of the plurality of duplexers.

17. The wireless device of claim 16 wherein each duplexer of the plurality of duplexers further includes an embedded trace to further provide impedance matching to enable the impedance matching using the single shunt inductor.

18. The wireless device of claim 15 wherein each duplexer of the plurality of duplexers includes the phase or impedance rotation element on each of a RX filter and a TX filter of each duplexer of the plurality of duplexers.

19. The wireless device of claim 18 wherein each duplexer of the plurality of duplexers further includes an embedded trace to further provide impedance matching to enable the impedance matching using the single shunt inductor.

20. The wireless device of claim 19 wherein each duplexer of the plurality of duplexers further includes a RX embedded trace as part of a RX filter path of the RX filter and a TX embedded trace as part of a TX filter path of the TX filter.

* * * * *